United States Patent

Sakamoto et al.

[15] 3,654,557

[45] Apr. 4, 1972

[54] SYSTEM FOR SELECTING CHANNEL

[72] Inventors: Yoichi Sakamoto, Toyonaka; Eisuke Ichinohe, Osaka, both of Japan

[73] Assignee: Matsushita Electric Industrial Co., Ltd., Kadoma-shi, Osaka, Japan

[22] Filed: Apr. 6, 1970

[21] Appl. No.: 25,628

[30] Foreign Application Priority Data

Apr. 14, 1969 Japan ..................................44/30692

[52] U.S. Cl. ..............................325/465, 325/454, 325/455, 325/457, 325/459, 325/460, 325/462, 325/468, 334/8, 334/14, 334/15, 334/18, 334/86, 334/87

[51] Int. Cl. ..........................................................H04b 1/26

[58] Field of Search ..................325/469, 332, 470, 452, 335, 325/433, 459, 453, 464, 465, 452–455, 457–460, 462, 468–470; 331/161; 334/14, 15, 8, 18, 86, 87

[56] References Cited

UNITED STATES PATENTS

| | | | |
|---|---|---|---|
| 3,551,820 | 12/1970 | Bagwell | 325/465 |
| 3,503,018 | 3/1970 | Cavanagh | 325/464 |
| 3,497,813 | 2/1970 | Gallagher | 325/453 |

OTHER PUBLICATIONS

Digital Computer Design Fundamentals, Y. Can, McGraw Hill Book Co., Inc., 1962, pgs. 318–322

*Primary Examiner*—Robert L. Griffin
*Assistant Examiner*—Albert J. Mayer
*Attorney*—Stevens, Davis, Miller & Mosher

[57] ABSTRACT

A system for selecting stations or channels for television broadcasting, wherein a signal from a binary signal generator is fed to a channel selection circuit for driving the same to select a channel circuit so as to obtain a corresponding DC voltage for impression on variable capacitance diodes to change the tuning condition. Mechanically operated parts such as mechanical switches are eliminated to facilitate fabrication of a totally electronic integrated circuit. Unnecessary channels may be automatically skipped, and the channel selection may be made in either a forward or reverse direction.

11 Claims, 25 Drawing Figures

Y. SAKAMOTO
AND
E. ICHINOHE
INVENTORS

BY Stevens, Davis, Miller & Mosher
ATTORNEYS

SYSTEM FOR SELECTING CHANNEL

The invention relates to systems for selecting television stations or channels using variable capacitance diodes as the resonant elements of the tuner in the television set, whereby the reverse voltage to be impressed on the variable capacitance diodes is electronically distributed.

The conventional system for selecting television stations is of a circuit construction as shown in FIG. 1 of the accompanying drawings. It comprises a high-frequency amplifier 1, a mixer 2, a local oscillator 3, an input resonance variable capacitance diode 4, intermediate stage resonance variable capacitance diodes 5 and 6, and a local oscillation variable capacitance diode 7. The voltage of a control power supply 8 is divided by variable resistors $9_1$ to $9_{12}$ for impression through switches $10_1$ to $10_{12}$ upon the variable capacitance diodes 4, 5, 6 and 7. The variable resistors $9_1$ to $9_{12}$ are preset to give respective voltage ratios so as to supply voltages suitable for the selection of the desired channels. When a switch in the group of switches $10_1$ to $10_{12}$ corresponding to a channel to be selected is closed, preset voltages are impressed on the respective variable capacitance diodes 4, 5, 6 and 7, thus selecting the desired station. The channel tuned is indicated by a pilot lamp in a group of pilot lamps $11_1$ to $11_{12}$, which is turned on as a closed circuit including it and a power supply 13 is made when a corresponding switch in a group of switches $12_1$ to $12_{12}$ is closed upon and in association with the action of the corresponding switch in the group of switches $10_1$ to $10_{12}$.

In the above example of the conventional system, the switches $10_1$ to $10_{12}$ as well as the switches $12_1$ to $12_{12}$ involve the mechanical action of the make-and-brake contacts for the impression of the divided voltages on the variable capacitance diodes, despite the contactless tuner proper, which is attained by using the variable capacitance diodes as the resonant elements, so that the merit of the tuner that enables the selection of stations absolutely electrically cannot be fully made use of to realize a contactless system for selecting television broadcasting stations.

An object of the invention is to solve the above drawback by the provision of a novel system for selecting television stations.

The invention will now be described in conjunction with a preferred embodiment thereof with reference to the accompanying drawings, in which.

Figure 2:
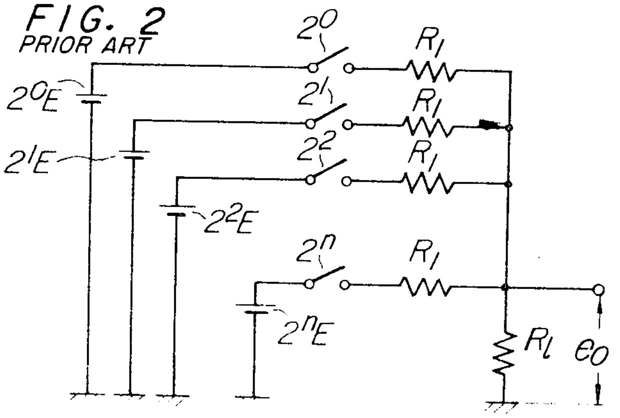
FIG. 2 PRIOR ART
FIG. 2 is a circuit diagram of an example of the conventional voltage generator.

A digital-analog converter in FIG. 2 has a plurality of resistors, which have a constant resistance and across which is applied voltages corresponding to respective bits of a digital signal to produce a resultant output voltage corresponding to the digital signal. The output voltage $e_0$ is given as $$e_0 = \frac{R_l}{R_1} E \left( \sum_{k=0}^{n} 2k \right), \qquad R_1 \gg R_l,$$

where $k$ represents only the closed switches of the switches $2^0$ to $2^n$, which connect respective power supplies with voltages $2^0E$ to $2^nE$ to respective parallel resistors $R_1$ each constituting a voltage divider with a resistor $R_l$. The smallest analog quantity is $2^0E$, so that a desired analog quantity cannot be generated by the digital control.

Figure 3:
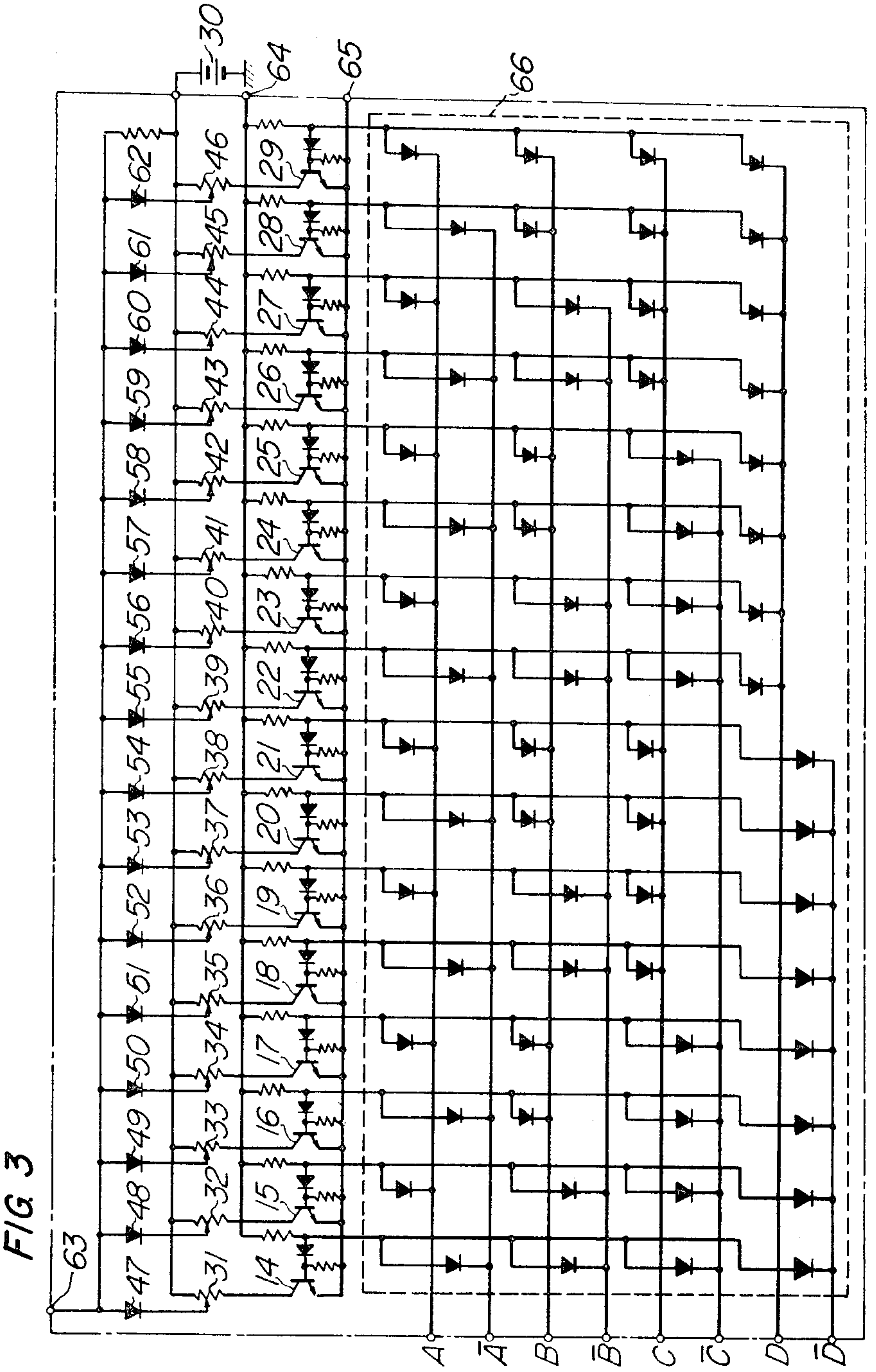
FIG. 3 is a circuit diagram of a digitally controlled analog voltage generator embodying the invention.

By the circuit shown in FIG. 3, however, it is possible to provide a digitally controlled analog voltage generator, whose operation is totally electrical. It has input terminals A, $\overline{A}$, B, $\overline{B}$, C, $\overline{C}$, D and $\overline{D}$, on which is impressed a binary signal. When the input to terminal A is at the high level, the input to terminal $\overline{A}$ is at the low level, and conversely when the input to terminal A is at the low level, the input to terminal $\overline{A}$ is at the high level. In other words, the terminals A and $\overline{A}$ receive simultaneous inputs at opposite levels. Similarly, the terminals B and $\overline{B}$, C and $\overline{C}$, and D and $\overline{D}$ receive respective input voltages at opposite levels. The binary signal [0000] corresponds to the input combination that the inputs to the terminals A, B, C and D are all at the low level and the inputs to the terminals $\overline{A}$, $\overline{B}$, $\overline{C}$ and $\overline{D}$ are all at the high level, while for the binary signal [1111] the individual terminals receive the inputs respectively at the opposite levels. It is thus possible to arrange that NAND gate circuits 14 to 29 shown in FIG. 3 (respectively corresponding to different channels in case of the television set) correspond to specific binary signals, as shown in Table 1 below.

TABLE 1

| Binary signal | NAND gate | Binary signal | NAND gate |
|---|---|---|---|
| 0000 | 1 | 1000 | 2 |
| 0100 | 3 | 1100 | 4 |
| 0010 | 5 | 1010 | 6 |
| 0110 | 7 | 1110 | 8 |
| 0001 | 9 | 1001 | 10 |
| 0101 | 11 | 1101 | 12 |
| 0011 | 13 | 1011 | 14 |
| 0111 | 15 | 1111 | 16 |

When a binary signal is impressed on the input terminals A, $\overline{A}$, B, $\overline{B}$, C, $\overline{C}$, D and $\overline{D}$, only the output of the corresponding NAND gate in Table 1 in inverted to the low level while the rest remains at the high level.

When the output of a NAND gate is at the low level, the load connected to the output terminal of the NAND gate carries current, while it carries no current when the output is at the high level. Therefore, it may be realized that current flows through only the loads connected to the output terminal of the NAND gate circuits of FIG. 3, whose output is at the low level.

For instance, when the binary signal [0000] is impressed on the group of input terminals A to D̄, current is caused through corresponding diodes in the enclosed block indicated at 66 and a load 31 of a NAND circuit 14. The resistive load 31 is tapped for connection through a diode 47 to an output terminal 63, which is connected to the variable capacitance diodes of the tuner of the television set, and at which there appears a voltage substantially equal to a divided voltage across a division of the resistor 31. Since there is no current through resistors 32 to 46, the cathodes of diodes 48 to 62 are at a potential equal to the voltage across the power supply 30 and higher than the anode potential, i.e., the divided voltage across the division of the resistor 31, so that the diodes 48 to 62 are off. It is to be understood that the forward voltage drop across the diode 47 is ignored. Similarly, by impressing another binary signal on the input terminals A to D̄ corresponding one of the NAND gates 14 to 29 is selected in accordance with Table 1 to produce a corresponding voltage predetermined by the output load thereof. This voltage may be designed to be an adjustable analog quantity.

The diodes connected to the base of the transistors of the NAND gates are level-shift diodes. A terminal 64 is connected to a power supply feeding the NAND gates, and a terminal 65 is a ground terminal.

With the digitally controlled analog voltage generator of the foregoing construction, the ratios of the voltage division between the voltage dividing resistors may be preset to desired values to produce output voltages of desired values corresponding to respective binary input signals; the generator is effective in producing voltages designed to correspond to the binary information. Also, with the embodiment of FIG. 3 the parts enclosed within the broken line 66 may be made into a semiconductor integrated circuit, and the resistors for the voltage division may be formed by base diffusion, so as to dispense with the external variable resistors, make the generator much smaller in size and render the cost thereof much lower. Of course, other integrated circuits than the semiconductor integrated circuit may be employed. Further, this embodiment is very effective to obtain voltages corresponding to the binary information transmitted through the remote control. Furthermore, as it is possible to have a low voltage on the input side of the NAND gate circuits and a high voltage on the load side thereof, a high output voltage is available from the generator of this construction even with a low voltage supply to the circuit for the channel selection through the binary signals, which is very advantageous in case a higher source voltage than that for the usual logic circuit is required.

Figure 4:
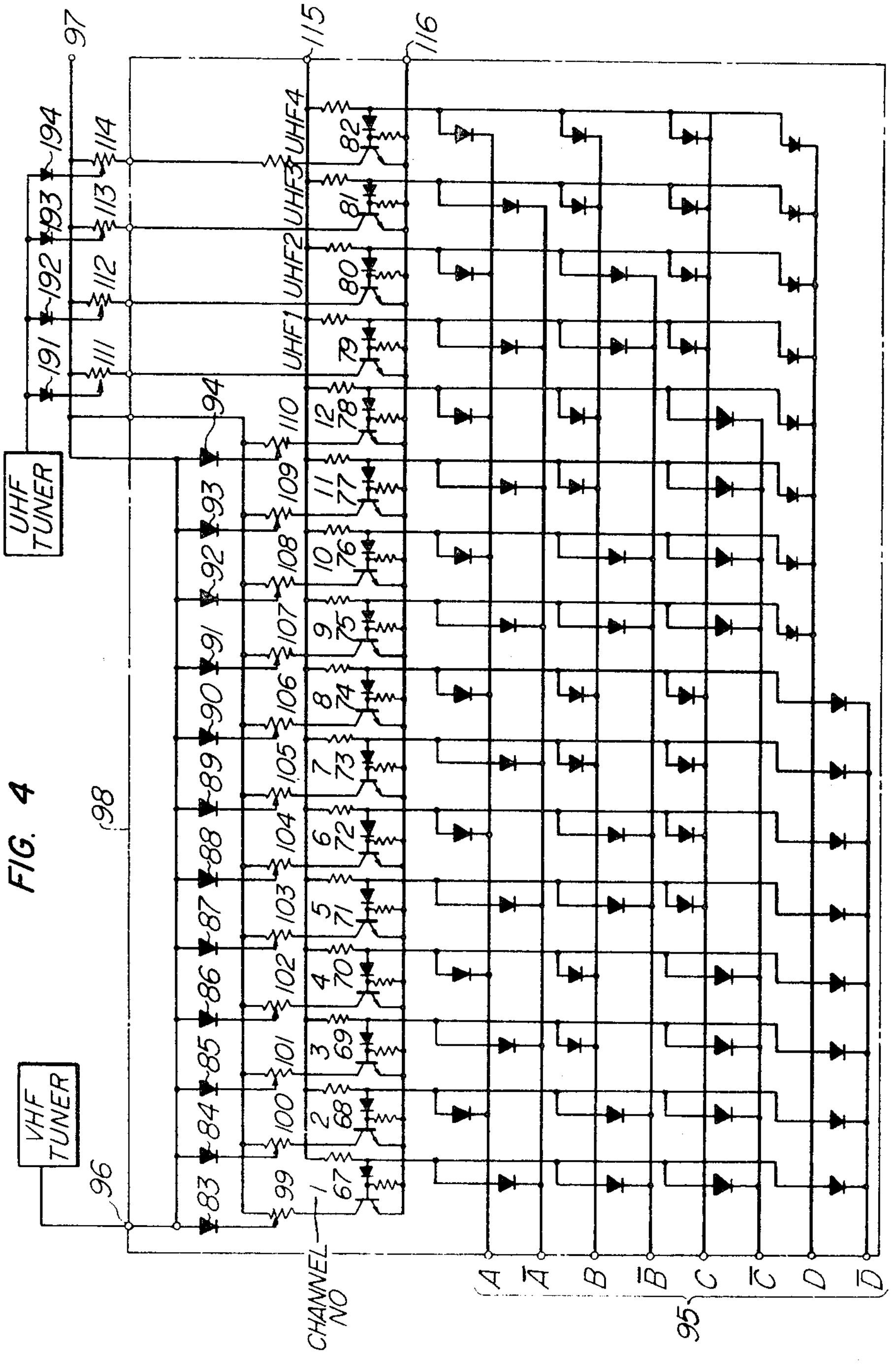
FIG. 4 is a circuit diagram of the arrangement of FIG. 3 as applied to a television receiving set.

In the application of the above analog voltage generator in a television receiving set, a binary signal corresponding to a desired channel is impressed on the set of the input terminals 95, as shown in FIG. 4, to produce a voltage appearing at a terminal 96 as a result of division of the voltage of a power supply connected to a terminal 97. The portion enclosed within a broken line loop represents an integrated circuit, which in this embodiment includes transistors, diodes and resistors, and in which resistors 99 to 110 for the voltage division for the VHF tuner are formed by base diffusion. As there are only 12 or less channels in the VHF band, the respective resistors may be fixed in the integrated circuit as in this embodiment. Resistors 111 to 114 are for the voltage division for the UHF tuner. As the UHF band for the television broadcasting contains a very large number of channels as compared to the VHF band, as many as several tens of channels, the relevant voltage divider resistors are provided separately from the integrated circuit to enable varying the voltage ratio thereof. As the number of the NAND gates should be increased if the number of the binary signals is increased, voltage divider resistors for respective channels in the UHF band may be incorporated into the integrated circuit using the diffusion technique. At the terminal 96 appears a source voltage of about 30 volts slightly higher than the maximum voltage impressed on the variable capacitance coupled diodes, and at a terminal 115 appears a voltage of about 5 volts of a power supply to feed the channel selection circuit consisting of the NAND gates. A terminal 116 is the ground terminal.

In operation, a binary signal is distributed over the digital signal input terminals A, Ā, B, B̄, C, C̄, D and D̄. When the input to the terminal A is at the high level, the input to the terminal Ā is at the low level, and conversely when the input to the terminal A is at the low level, the input to the terminal Ā is at the high level. Thus, inputs at the opposite levels are simultaneously fed to the respective terminals A and Ā. Similarly, the terminals B and B̄, C and C̄, and D and D̄ receive respective input voltage pairs of voltages at the opposite levels. The binary signal [0000] corresponds to the simultaneous impression of the low-level input on the terminals A, B, C and D and the high-level input on the terminals Ā, B̄, C̄ and D̄, while for the binary signal [1111] the individual terminals receive the inputs respectively at the opposite levels to the above levels. Accordingly, it is possible to arrange that the NAND gates 67 to 82 in FIG. 4 correspond to binary signals in a manner as listed in Table 2.

TABLE 2

| Channel | Binary signal | Channel | Binary signal |
|---|---|---|---|
| 1 | 0000 | 9 | 1000 |
| 2 | 0001 | 10 | 1001 |
| 3 | 0010 | 11 | 1010 |
| 4 | 0011 | 12 | 1011 |
| 5 | 0100 | UHF-1 | 1100 |
| 6 | 0101 | U HF-2 | 1101 |
| 7 | 0110 | UHF-3 | 1110 |
| 8 | 0111 | UHF-4 | 1111 |

When a binary signal is impressed on the input terminal set 95, a NAND gate for a corresponding channel in Table 2 is selected from the NAND gates 67 to 82 through the associated diodes in the diode group to cause current to flow through the load of the selected NAND gate. For instance, when the binary signal [0000] is impressed on the terminal set 95, current is caused to flow through only a resistor 99 connected to the NAND gate 67. As s result, a voltage substantially equal to a voltage drop across a division of the resistor 99, which is tapped for connection through a diode 83 to the power supply terminal 97, appears at the terminal 96, since no current is caused through resistors 100 to 114 and the cathodes of diodes 84 to 94 are at a potential equal to the voltage across the power supply 97 and higher than the anode potential, i.e., the voltage across the division of the resistor 99, so that the diodes 84 to 94 and 191 to 194 are off. It is to be understood that the forward voltage drop across the diode 83 is ignored. Similarly, upon impression of a different binary signal on the input terminals A to D̄ a specific NAND gate among the NAND gates 67 to 82 is selected in accordance with Table 2 to produce the desired voltage across the output load thereof. This voltage may be designed to be an adjustable analog quantity. The channel selection circuit consisting of the NAND gates for selecting a given channel corresponding to an impressed binary signal may of course be replaced by other logic circuits.

As is described, unlike the conventional channel selection system that still uses many of the mechanical switch contacts to switch a desired voltage for impression on the variable capacitance diodes in spite of a contactless tuner construction realized by the use of the variable capacitance diodes as the resonant elements, the embodiment of FIG. 4 enables the switching of voltages for impression on the variable capacitance diodes by means of only electrical circuits, thus providing an the over-all system, as well as the tuner proper, which is free from switch contacts thereby outstandingly improve the reliability of the channel selection system. Also, the component parts are all digital-mode circuits suitable for integration into an I.C. to drastically reduce the difficulty of wiring for the over-all channel selection system. Further, as the operation is entirely electronic, free from mechanical drive such as motors, remote control may be realized.

A circuit for generating binary signals to be impressed on the input terminal set 95 in FIG. 4 will now be described. For the sake of simplification, a signal generator to generate three-digit binary signals is detailed with reference to FIG. 5. It comprises a clock pulse generator 117, flip-flops 118, 119 and 120 respectively having output terminals 121 and 122, 123 and 124, and 125 and 126, switches 127 and 128 and NAND gates 129 to 132. The NAND gate 129 has input terminals respectively connected to the switch 127 and to the output terminal 121 of the flip-flop 118, and the NAND gate 130 has input terminals respectively connected to the switch 128 and the output terminal 122 of the flip-flop 118. Similar ly, the NAND gate 131 has input terminals respectively connected to the switch 127 and to the output terminal 123, and the NAND gate 132 has input terminals respectively connected to the switch 128 and to the output terminal 124. In this embodiment, the switches 127 and 128 of the preceding circuit controls not only a reversible counter circuit consisting of the flip-flops 118 to 120 and the NAND gates 129 to 132, but also simultaneously controls the clock pulse generator 117. The output terminals 121 to 126 of the flip-flops 118 to 120 are connected to the respective input terminals A, $\bar{A}$, B, $\bar{B}$, C and $\bar{C}$ of the channel selection circuit.

In operation, when the terminal A receives input at the high level, the terminal $\bar{A}$ receives input at the low level, and conversely when the terminal A receives input at the low level, the terminal $\bar{A}$ receives input at the high level. Thus, the terminals A and $\bar{A}$ receive inputs at the opposite levels to each other. Similarly, the terminals B and $\bar{B}$, and C and $\bar{C}$ receive respective inputs in pairs of voltages at the opposite levels. Accordingly, different binary signals may correspond to respective channels in a manner as shown in Table 3, with the signal [000] corresponding to the simultaneous impression of the low-level input on the terminals A, B and C and the high-level input on the terminals $\bar{A}$, $\bar{B}$ and $\bar{C}$ and the signal [111] corresponding to the simultaneous impression of the inputs at the opposite levels to the above on the respective terminals.

TABLE 3

| Binary signal | Channel | Binary signal | Channel |
|---|---|---|---|
| 000 | 1 | 001 | 5 |
| 100 | 2 | 101 | 6 |
| 010 | 3 | 011 | 7 |
| 110 | 4 | 111 | 8 |

A desired channel may be selected through a tuner having resonant elements constituted by variable capacitance diodes, on which is impressed an appropriate reverse voltage. Thus, by impressing the output of the aforementioned reversible counter circuit on the terminals A to $\bar{C}$, a channel corresponding to the binary signal output of the counter may be selected. As the counter is a reversible counter and is controlled synchronously with the start of the operation of the clock pulse generator 117, either forward or reverse switching may be attainable when it is desired to switch a channel over to another channel.

Figure 5:
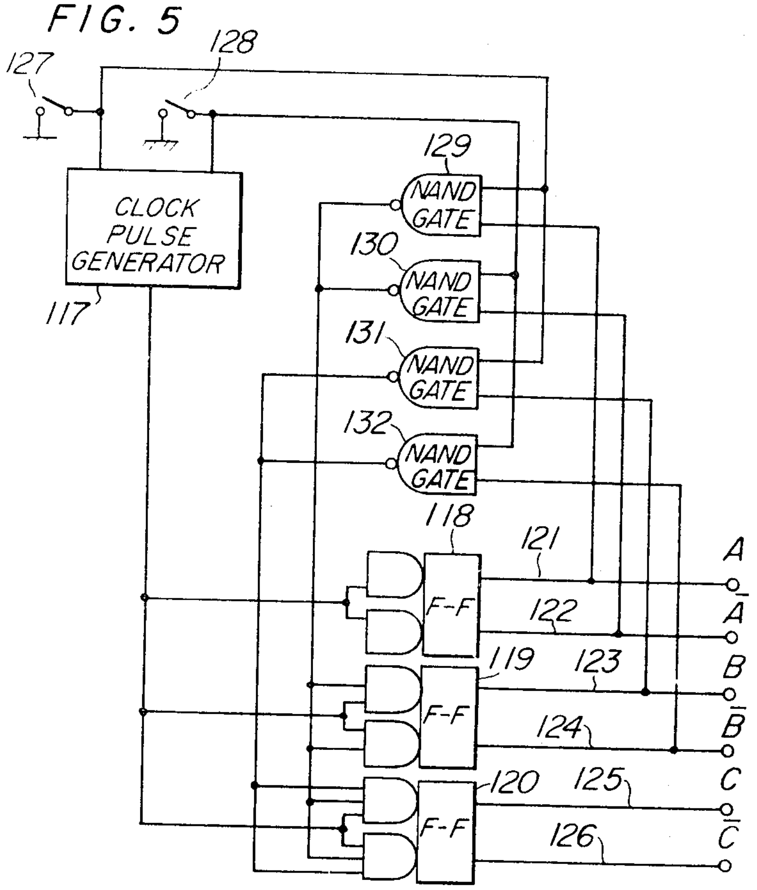
FIG. 5 is a block diagram showing part of the system for selecting television stations according to the invention.
Figure 6:
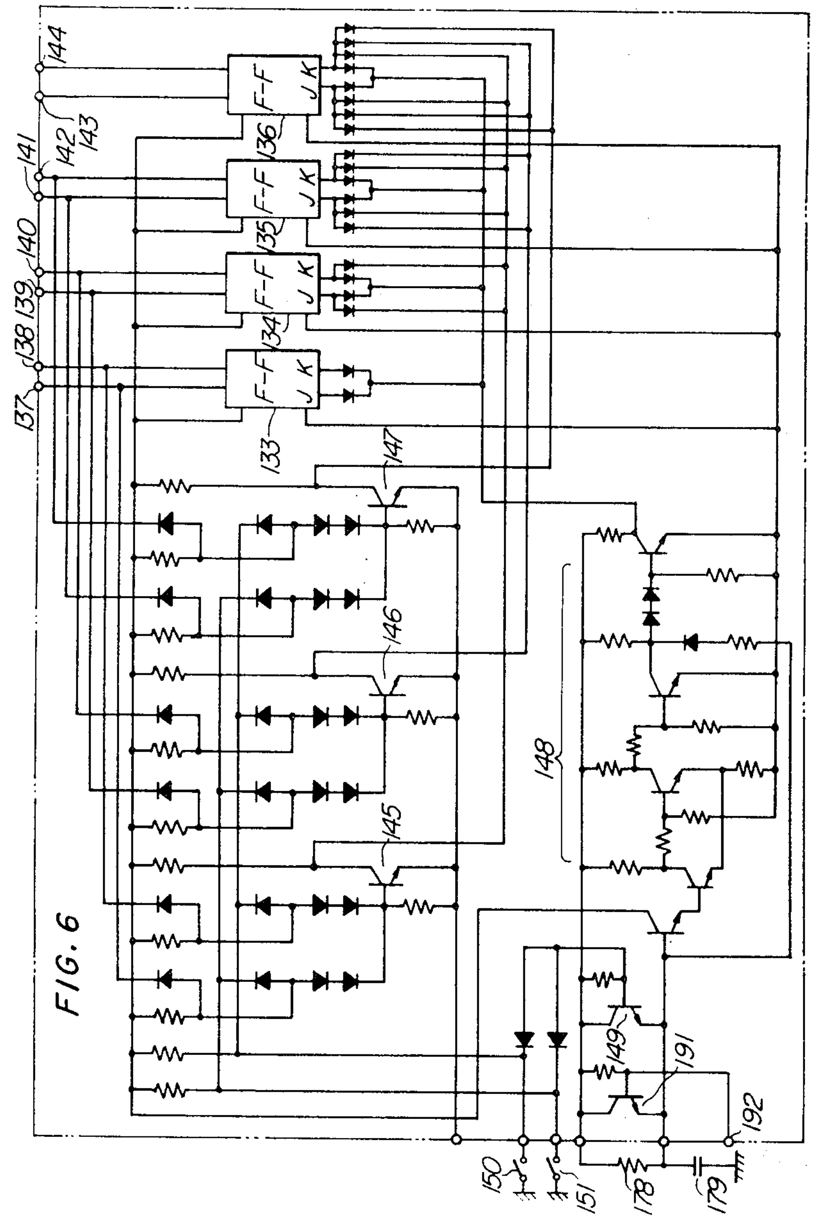
FIG. 6 is a circuit diagram showing the detailed circuit connections of the arrangement of FIG. 5.

FIG. 6 shows in detail the clock pulse generator and counter of the circuit of FIG. 5. In this circuit, J-K flip-flops 133 to 136 correspond to the respective flip-flops 118 to 120 of the circuit of FIG. 5. Their outputs appear at respective terminals 137 to 144. Gate circuits 145 to 147 correspond to the NAND gates 129 to 132. Numeral 148 designates a clock pulse generator, the pulse period and pulse width for which are determined by a resistor 178 and a capacitor 179. The clock pulse generator 148 becomes operative when a transistor 149 is triggered upon closure of either one of switches 150 and 151, which also control the gate circuits 145 to 147 so as to determine whether a flip-flop is driven from the output of the next lower-digit flip-flop. Thus, either a forward or reverse switching of channels is possible.

Figure 7:
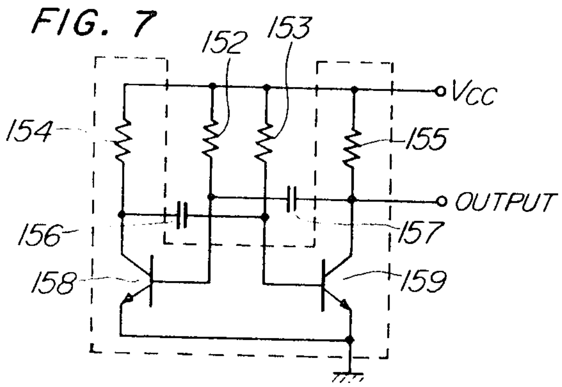
FIG. 7 is a circuit diagram illustrating the principles of the usual flip-flop circuit.

With regard to the construction of the clock pulse generator 148 of the circuit of FIG. 6, the fabrication of a semiconductor integrated circuit including inductors is in general extremely difficult, and the formation of a capacitor with capacitance exceeding several tens of picofarads or a resistor with resistance exceeding several tens of kiloohms requires an extremely large silicon substrate which is economically a disadvantage. For these reasons a non-stable multi-vibrator as shown in FIG. 7 is most extensively used as the pulse generator. Assuming a pulse oscillation at an extremely low frequency, for instance of the order of several cycles, resistors 152 and 153 are required to have a resistance of about 100 kiloohms and capacitors 156 and 157 need to have a capacitance of about 1 microfarad, so that the incorporation of these parts 152, 153, 156 and 157 into a semiconductor integrated circuit becomes extremely difficult. Therefore, in integrating the above circuit, which also includes resistors 154 and 155 and transistors 158 and 159, in a semiconductor chip, only the portion enclosed within the dashed line loop is integrated, which necessitates six connection pins. Also six pins are necessary even if the integration is made to include the resistors 152 and 153 with sacrifice of economy. Thus, the circuit of FIG. 7 has disadvantages in that the integration thereof is only partly feasible requiring either four or two separate parts to be connected to the integrated circuit, which inevitably requires many connection pins, so that the merit of the integration cannot be displayed to the fullest extent.

Figure 8:
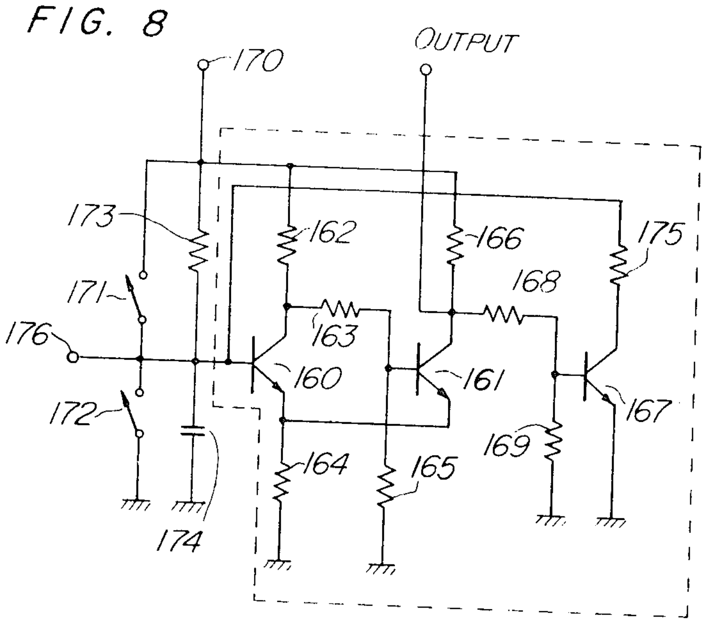
FIG. 8 is a circuit diagram showing part of the arrangement of FIG. 5.

A pulse generator, which is most suitable for integration into an S.I.C., is shown in FIG. 8. It utilizes a Schmitt trigger circuit to control charging and discharging of a capacitor. Transistors 160 and 161 and resistors 162 to 166 constitute the Schmitt trigger circuit, which controls a gate circuit including transistor 167 and resistors 168 and 169.

For operation, a power supply (for instance of +5 volts) is connected to a terminal 170, and switches 171 and 172 are initially open and closed respectively. When the switch 172 is then opened, the potential of a terminal 176 increases as current through a resistor 173 charges a capacitor 174. As long as the potential at the terminal is lower than a predetermined voltage $V_{on}$ (1.81 volts in this example) to trigger the transistor 160, the transistor 160 is off, the transistor 161 is on, and the transistor 167 is off. Under these conditions, the capacitor 174 is charged through the resistor 173 but not discharged through the resistor 175. When the potential of the terminal 176 exceeds $V_{on}$, the transistor 160 is triggered, the transistor 161 is cut off, and the transistor 167 is triggered. At this time, the capacitor is simultaneously charged through the resistor 173 and discharged through the resistor 175. Under the conditions $$R_{173}/(R_{173}+R_{175}) < V_{on}/V_{cc}$$

where $R_{173}$ and $R_{175}$ are respectively the resistances of the resistors 173 and 175, and $V_{cc}$ is the source voltage, the discharging current is higher than the charging current, so that the potential of the terminal 176 gradually decreases. So long as the potential of the terminal 176 is higher than a predetermined voltage$_{off}$ (1.39 volts in this example) to cut off the transistor 160, the transistor 160 is on, the transistor 161 is off, and the transistor 167 is on, so that the discharge is continued. When the potential of the terminal 176 gets lower than $V_{off}$, the transistor 160 is cut off, the transistor 161 is triggered, and the transistor 167 is cut off, and as a result the capacitor 174 is charged through the resistor 173 to increase the potential of the terminal 176. In this manner, the potential of the terminal 176 varies within the hysteresis width for the Schmitt trigger circuit to produce a pulse oscillation at a time constant determined by the resistors 173 and 175 and the capacitor 174.

By way of example, with the resistor 173 having a resistance of 200 kiloohms, the resistor 175 having a resistance of 5 kiloohms and the capacitor 174 having a capacitance of 10 microfarads, a pulse oscillation with a pulse width of 0.25 second and a pulse repetition period of 0.263 second may be obtained. Also, with the resistor 173 of 200 kiloohms in resistance, the resistor 175 of 5 kiloohms in resistance and the capacitor 174 of 100 microfarads to 100 picofarads in capacitance, stable pulse oscillations at pulse repetition frequencies of 0.38 cycle to 150 kilocycles are obtained.

The above pulse generator may be readily integrated as a whole except for the charging and discharging capacitor into an I.C., thus reducing the number of the external parts and the associated connection pins; the portion enclosed within the dashed line loop in FIG. 8 may be in the form of a semiconductor integrated circuit, which requires only four connection pins, two for the power supply and two for the input and output terminals. It is capable of readily controlling the pulse width and pulse frequency as well as the start and stop of the oscillation.

Figure 1:
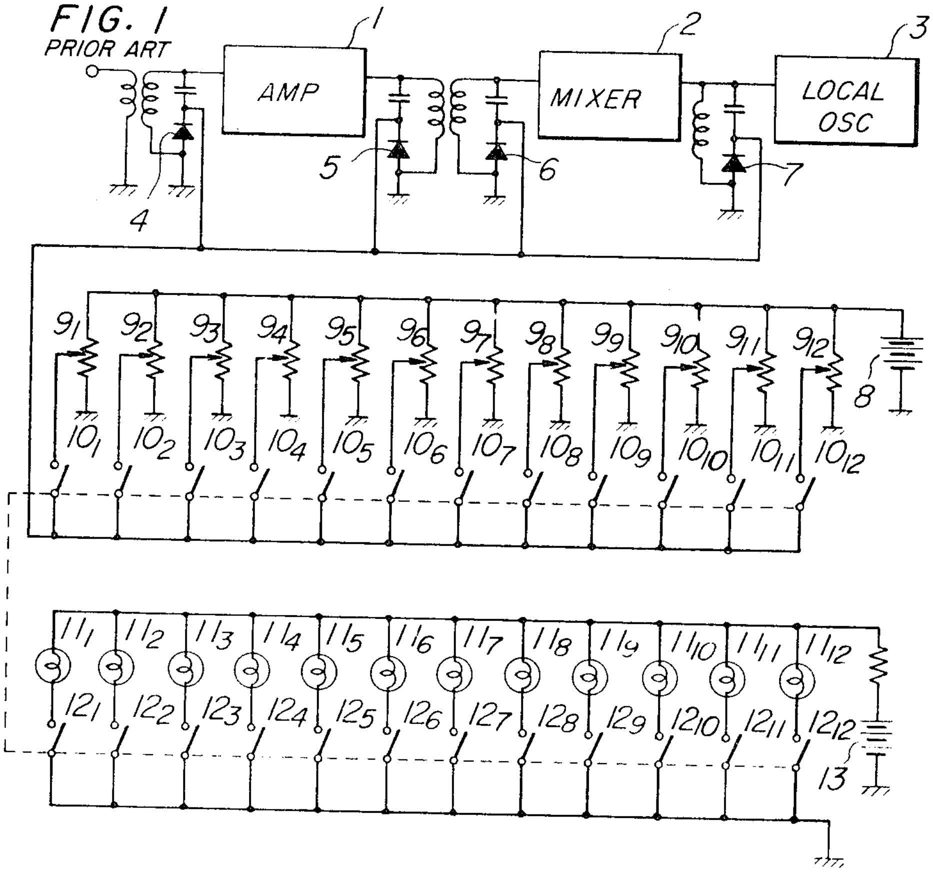
FIG. 1 PRIOR ART
FIG. 1 is a circuit diagram, partly in the block form, showing an example of the conventional system for selecting television stations.
Figure 9:
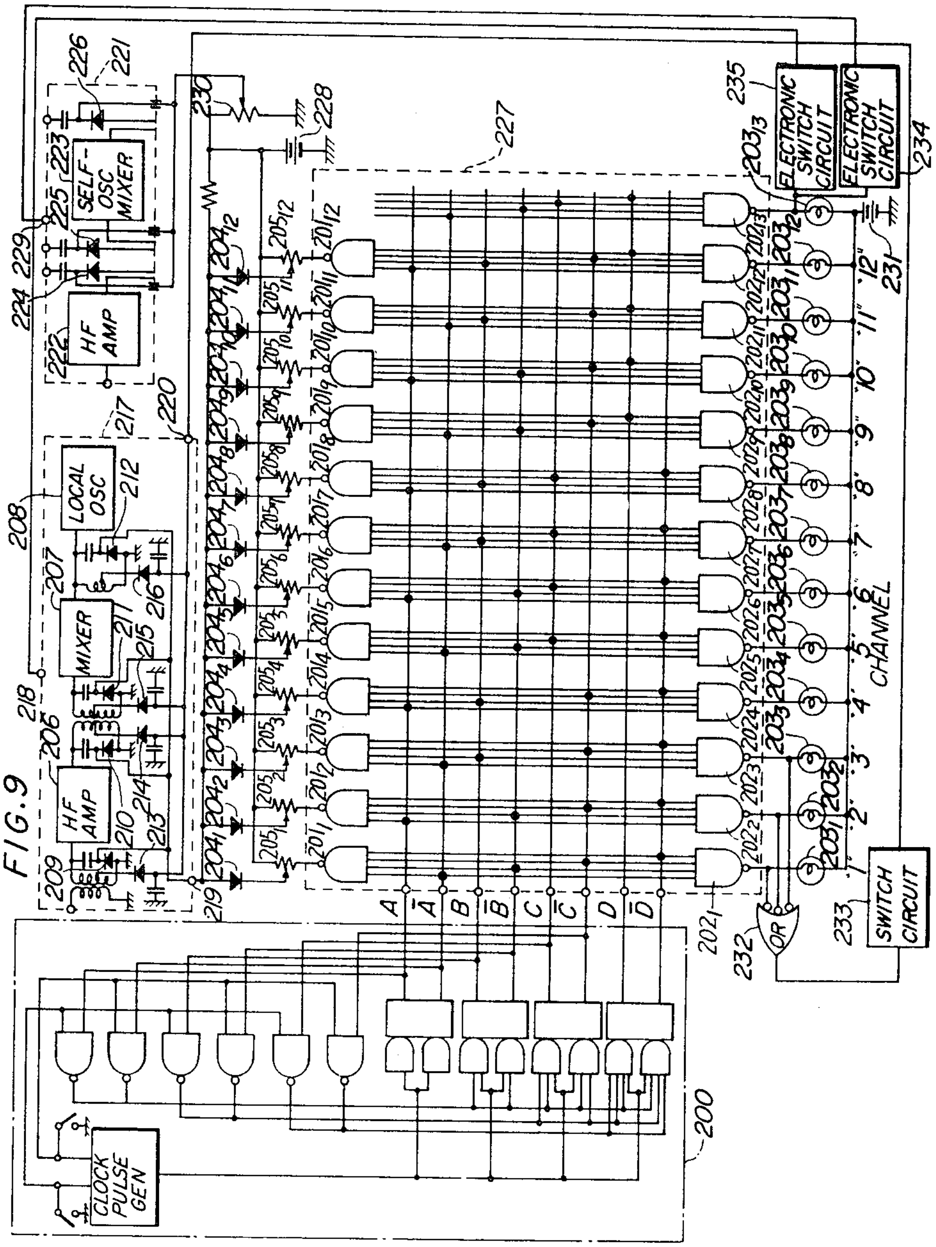
FIG. 9 is a circuit diagram, partly in block form, showing part of an embodiment of the system for selecting television stations according to the invention.

FIG. 9 shows a completely electric tuning system in a television set for selecting television stations embodying the invention. In the figure, parts 206 to 212 correspond to the respective parts 1 to 7 in the conventional system of FIG. 1. Diodes 213 to 216 are triggered or cut off to ground or up-ground high-frequency-wire the intermediate taps of the resonance coils of the input stage, intermediate stage and oscillator. The portion enclosed within a dashed line loop 217 constitutes a VHF tuner, which has a terminal 218 connected to a power supply, a terminal 219 for impression of voltages on the variable capacitance coupled diodes and a terminal 220 connected to a power supply providing a positive or negative voltage for switching between the high and low bands. The portion enclosed within a dashed line loop 221 constitutes a UHF tuner comprising a high-frequency amplifier 222, a self-oscillating mixer 223, interstage variable capacitance diodes 224 and 225 and a local oscillation variable capacitance diode 226. A terminal 229 of the UHF tuner 226 is a power supply terminal. The circuit generally indicated at 200 is substantially the same as the reversible counter circuit of FIG. 5 and differs therefrom only in the number of stages, so that the detailed description is omitted. Its output terminals are connected to respective input terminals of the channel selection circuit 227, and the one-to-one correspondence between binary signals and channels is the same as that in the case of FIG. 4 and Table 2.

When a binary signal among those listed in Table 2 is impressed on the input terminals A to $\overline{D}$ of the channel selection circuit 227, the output of corresponding ones of NAND gates $201_1$ to $201_{12}$ and $202_1$ to $202_{13}$ is inverted to the low level, while the output of the rest of the NAND gates remains at the high level. Only 13 channels are employed among the 16 channels in the system of FIG. 9, but a desired number of channels may be adopted for use by accordingly designing the channel selection circuit. Current flows through the loads of NAND gates whose output is at the low level, and there is no current through the loads of NAND gates whose output is at the high level. When the binary signal [0000] is impressed on the input terminals of the channel selection circuit 227, the load side output of the NAND gates $201_1$ and $202_1$, which correspond to the specified channel 1, falk into the low level to cause current to flow. As far as the NAND gates $201_1$ to $201_{12}$ are concerned, current flows only through the load $205_1$ the NAND gate $201_1$. As a result, a voltage substantially equal to a voltage drop across a division of the resistor $205_1$, which is tapped for connection through a diode $204_1$ to the terminal 219 to divide the voltage across the power supply 228 at an appropriate ratio, appears at the terminal 219, since no current is caused through resistors $205_2$ to $205_{12}$ and the cathode of diodes $204_2$ to $204_{12}$ is at a potential equal to the voltage across the power supply 228 and higher than the anode potential, i.e., the voltage across the division of the resistor $205_1$, so that the diodes $204_2$ to $204_{12}$ are off. It is to be understood that the forward voltage drop across the diode $204_1$ is ignored. By applying an appropriate reverse voltage across the variable capacitance diodes 209 to 212 of the VHF tuner 217 or across the variable capacitance diodes 224 to 226 of the UHF tuner, a desired channel may be selected, as these variable capacitance diodes are resonant elements. Accordingly, by presetting the voltage ratios for the resistors $205_1$ to $205_{12}$ and the variable resistor 230 to values giving voltages appropriate for the selection of the respective channels, a channel corresponding to a binary signal output of the aforementioned counter circuit 200 may be selected when the output is impressed on the input terminals A to $\overline{D}$ of the channel selection circuit 227. As the counter circuit 200 is reversible counter as shown in FIG. 6, and is controlled synchronously with the start of the operation of the clock pulse generator, the switching of channels in either forward or reverse direction is possible.

The resistors $205_1$ to $205_{12}$ for voltage division of the system of FIG. 9 are formed by the integrated circuit technique. In particular, they may be formed by diffusion in the same semiconductor ship that contains the channel selection circuit and the counter circuit. The VHF band adopted for television broadcasting, unlike the radio broadcast band, is divided into a particular number of channels, for instance 12 channels in Japan, with each channel covering a specific segment in the frequency spectrum, so that it is possible to predetermine the voltage ratios at the time of fabricating the integrated circuit as in the preceding embodiment. For the UHF band, the frequencies of the waves to be received are tuned in by varying the resistance of the variable resistor 230.

Similar to the NAND gates $201_1$ to $201_{12}$, the output of a particular NAND gate among the NAND gates $202_1$ to $202_{13}$ corresponding to a binary signal impressed on the terminal A to $\overline{D}$ undergoes level-shift into the low level. As a result, current from a source 231 flows through a particular pilot lamp to indicate the channel tuned in. An OR circuit 232 serves to provide the high-level output during the reception of a channel in the lower range of the VHF band, one of the channels 1 to 3 in Japan, through the action of a switch circuit 233, which is an electronic circuit. During the low band reception, the output from the switch circuit 233 cuts current through the diodes 213 to 216 of the VHF tuner 217 to disconnect high-frequency-wire the intermediate taps of the resonant coils from the ground so as to enable reception of the channel in the low band. During the reception of the high band, the output of the switch circuit 233 permits current to flow through the diodes 213 to 216 in the VHF tuner 217 to ground high-frequency-wire the intermediate taps of the resonant coils so as to enable reception of a high-band channel.

During the reception of a channel in the UHF band, the low-level output appears on the load side of the NAND gate $202_{13}$ causing current therethrough to indicate that the UHF band is being received. At the same time an electronic switch circuit 234 connects the UHF tuner to the power supply, while the output of the electronic switch circuit 235 disconnects the VHF tuner from the power supply. On the other hand, during the reception of a channel in the VHF band the output of the NAND gate $202_{13}$ is at the high level to the result that the relation between output of the electronic switch circuits 234 and 235 is reversed to connect the VHF tuner 217 to the power supply and disconnect the UHF tuner 221 from the power supply.

Figure 11A:
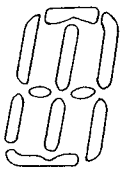
FIG. 11 (*a,b*) shows symbol patterns of pilot indicators.
Figure 11B:
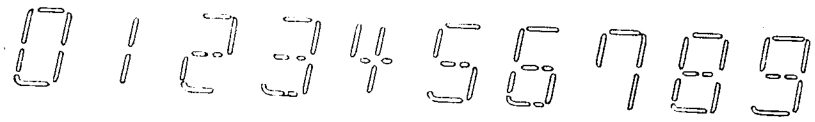
Figure 10:
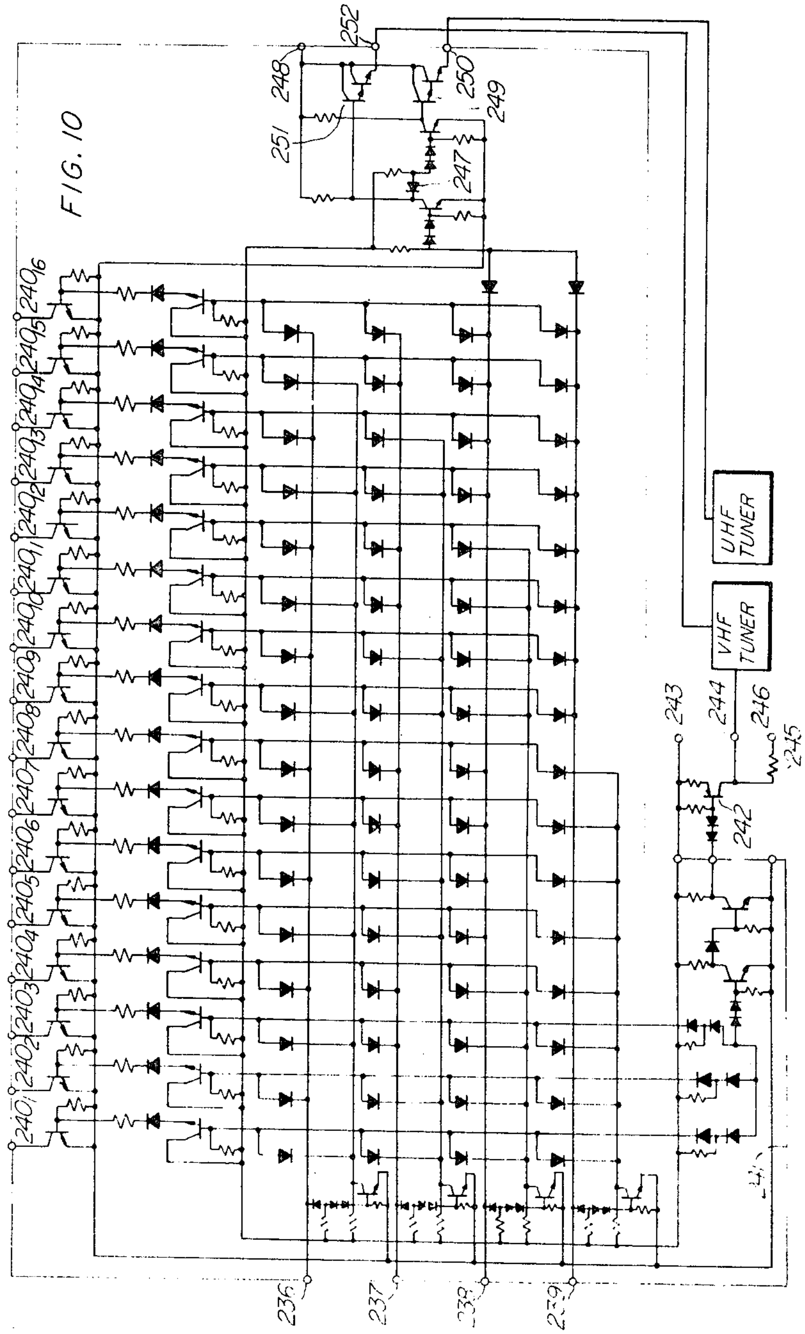
FIG. 10 is a circuit diagram showing detailed circuit connections of part of the embodiment of FIG. 9.

FIG. 10 shows in detail the channel indicator drive, the circuit for switching between the high and low bands of the VHF band, and the circuit for switching between the power supplies for the UHF tuner and the VHF tuner in the embodiment of FIG. 9. For the sake of simplification, the binary signal input terminal set is made to consist of only four terminals 236 to 239. Transistors $240_1$ to $240_{16}$ act to drive respective pilot lamps. They may of course be designed to drive indicators other than the pilot lamps, for instance figure indicator discharge tubes, or alternatively the diode matrix of the channel selection circuit may be modified in such a manner as to enable employing, for instance, figure indicator tubes having a fundamental indication pattern as shown in FIG. 11*a* and designed to indicate respective figures as shown at FIG. 11*b*. Circuit parts 241 and 242 of the circuit of FIG. 10 respectively correspond to the OR switch circuit 232 and the switch circuit 233 of FIG. 9. When the switch circuit 242 is on, current flows from a power supply terminal 243 to a terminal 244 to provide for the forward diode current in the circuit for switching between the high and low bands of the VHF band. When the switch circuit 242 is off, current is caused to flow through a resistor 245 of a high resistance to produce a negative voltage at the terminal 244 with respect to a terminal 246 so as to impress a reverse voltage across the diodes of the circuit for switching between the high and low bands of the VHF band. During the reception of the UHF band, the output of the NAND gate 246 is at the low to cause current from a power supply connected to a power supply terminal 248 through a switch circuit 249 and a terminal 250 to the UHF tuner. At this time, there is no current from a terminal 252 to the VHF tuner, since the switch circuit is cut off. On the other hand, during the reception of the VHF band current does not flow into the UHF tuner but flows into the VHF tuner.

Figure 12:
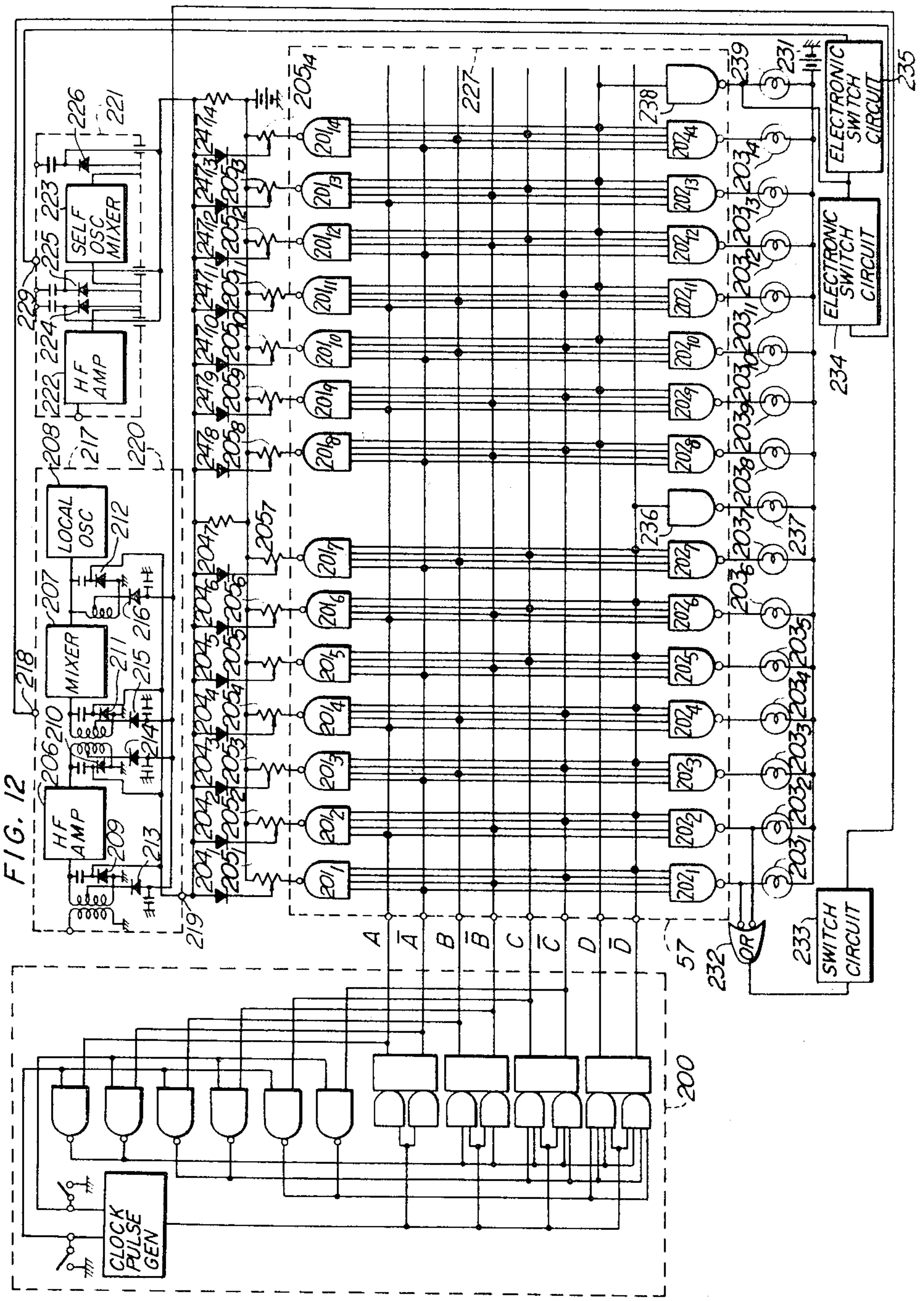
FIG. 12 is a circuit diagram, partly in block form, showing part of another embodiment of the system for selecting television stations according to the invention.

Another embodiment utilizing the circuit construction shown in FIG. 9 is shown in FIG. 12, where like parts are designated by like reference numerals, and therefore any description which might overlap is omitted. When the low-level voltage is present at the terminals A, B, C and D and the high-level voltage is present at the terminals $\bar{A}$, $\bar{B}$, $\bar{C}$ and $\bar{D}$, the bits constituted by the respective terminal pairs $A\bar{A}$, $B\bar{B}$, $C\bar{C}$ and $D\bar{D}$ each assume digit 0, while the binary signal [1111] corresponds to the presence of the output at the opposite level at the terminals in pairs $A\bar{A}$, $B\bar{B}$, $C\bar{C}$ and $D\bar{D}$. Individual binary signals correspond to respective channels as shown in Table 4 below.

TABLE 4

| Channel | Binary signal | Channel | Binary signal |
|---|---|---|---|
| 1 | 0000 | UHF-1 | 1000 |
| 2, 3 | 0001 | UHF-2 | 1001 |
| 4, 5 | 0010 | UHF-3 | 1010 |
| 6, 7 | 0011 | UHF-4 | 1011 |
| 8, 9 | 0100 | UHF-5 | 1100 |
| 10, 11 | 0101 | UHF-6 | 1101 |
| 12 | 0110 | UHF-7 | 1110 |

It is to be noted that the channels 2 and 3, channels 4 and 5, channels 6 and 7, channels 8 and 9 and channels 10 and 11 are in respective pairs. This combination in pairs of the channels in Table 4 is possible for the VHF band, because of the facts that adjacent channels for the television broadcasting are usually not authorized at the same time in the same region, and that the boundary between the high and low bands is located between the channels 3 and 4 in Japan. There are 13 to 62 UHF channels in Japan, but only seven or less channels are actually authorized for television broadcasting in the same region. Though there are seven VHF channels and seven UHF channels in Table 4, the total four-bit signals can correspond to eight different VHF channels and eight different UHF channels.

By impressing an appropriate reverse voltage across the variable capacitance diodes 209 to 212 of the VHF tuner or across the variable capacitance diodes 224 to 226 a desired channel may be selected through the relevant tuner having the variable capacitance diodes as the resonant elements, so that by presetting the voltage ratios for the variable resistors $205_1$ to $205_{14}$ to values giving respective voltages to suit the requirements for receiving respective channels a channel may be selected when a corresponding binary signal output of the aforedescribed counter circuit is impressed on the set of input terminals A, $\bar{A}$, B, $\bar{B}$, C, $\bar{C}$, D and $\bar{D}$. As the counter circuit is a reversible counter circuit and is controlled synchronously with the start of the operation of the clock pulse generator circuit, the switching of a channel over to another can be made in either a forward or reverse direction.

The output of a particular NAND gate among the NAND gates $202_1$ to $202_{14}$ corresponding to a binary signal impressed on the terminals A to $\bar{D}$ undergoes level-shift into the low level. As a result, current from the source 231 flows through a particular pilot lamp to indicate the channel tuned in. As the input terminal of a NAND gate 236 is connected to the input terminal $\bar{D}$, the output during the reception of the VHF band is at the low level, as will be apparent from the one-to-one correspondence in Table 4, and a pilot lamp 237 is turned on to indicate that VHF band is being received. Similarly, a NAND gate 238 acts to light a pilot lamp 239 during the reception of the UHF band. The pilot lamps to indicate respective channels may be replaced with other indicating means such as figure indicator discharge tubes.

The OR circuit 232 provides the high-level output during the reception of a channel in the lower range of the VHF band through the action of the electronic switch circuit 233. During the reception of a channel in the lower VHF range, the output from the switch 233 cuts current through the diodes 213 to 216 of the VHF tuner 217 to de-ground the intermediate taps of the resonant coils from the high-frequency point of view, so as to enable the reception of the low band channel. During the reception a channel in the higher range of the VHF band, the output of the switch 233 permits current flowing through the diodes 213 to 216 to ground the intermediate taps of the resonant coils under high-frequency so as to enable the reception of the high-band channel.

During the reception of a VHF-band channel the load side output of the NAND gate 238 is at the high level, while during the reception of a UHF-band channel it is at the low level. This is utilized to actuate the electronic switch circuits 234 and 235, which connect the VHF-band tuner to the power supply while disconnecting the UHF-band tuner from the power supply during the reception of the VHF-band channel and disconnect the VHF-band tuner from the power supply while connecting the UHF-band tuner to the power supply during the reception of the UHF-band channel.

Figure 13:
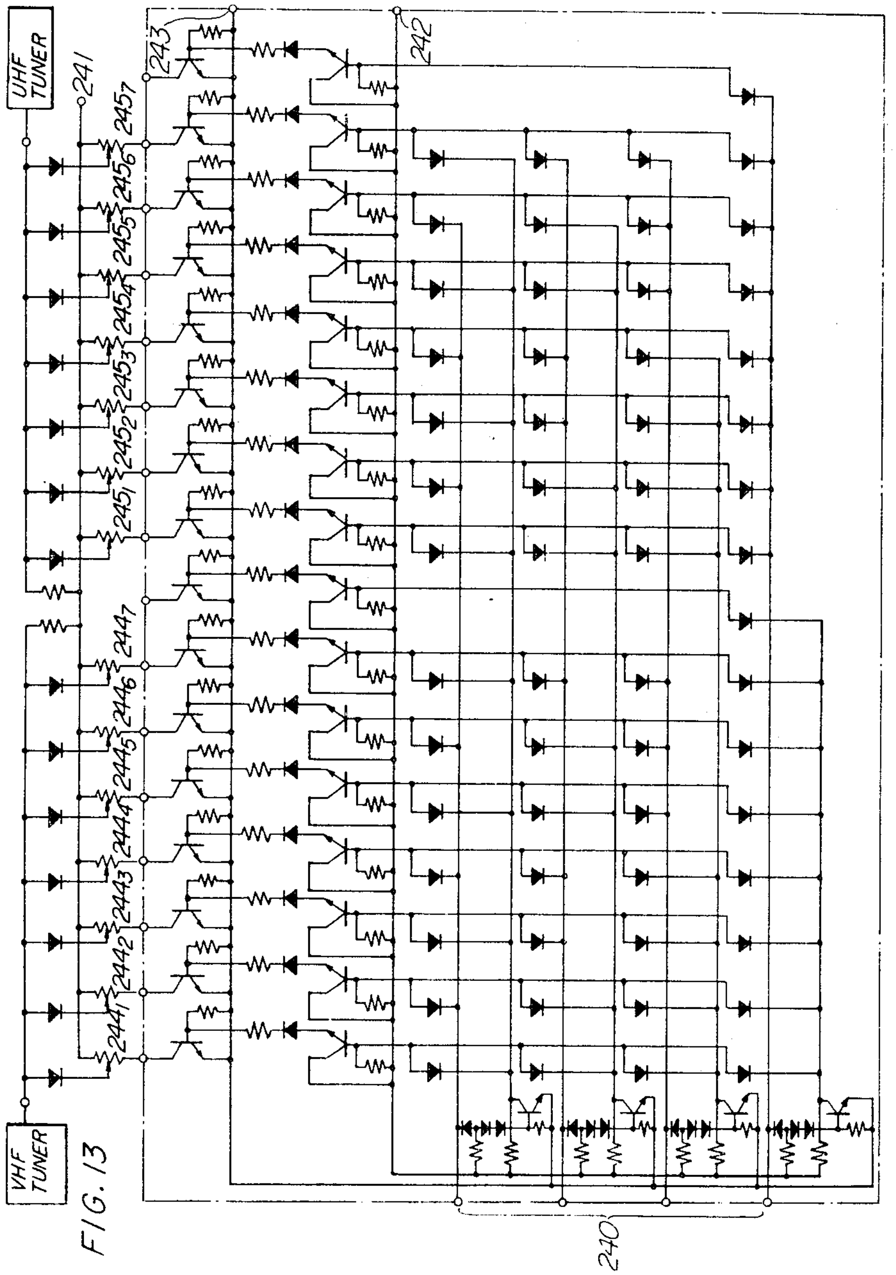
FIG. 13 is a circuit diagram showing detailed circuit connections of part of the embodiment of FIG. 12.

FIG. 13 shows in detail the channel selection circuit and the voltage generator circuit of the system of FIG. 12. Binary signals are impressed on the terminal set 240. A terminal 241 is connected to a power supply to provide a voltage of about 30 volts, which is slightly higher than the maximum voltage to be impressed across the variable capacitance diodes, a terminal 242 is connected to a power supply to provide a voltage of about 5 volts to the channel selection circuit of the NAND gates, and a terminal 243 is connected to the ground. The voltages to be impressed on the variable capacitance diodes of the VHF band tuner are regulated through respective variable resistors $244_1$ to $244_7$, and the voltages to be impressed on the variable capacitance coupled diodes of the UHF band tuner is regulated through variable resistors $245_1$ to $245_7$. The operation of these variable resistors has been described hereinbefore, and is not repeated.

Figure 14:
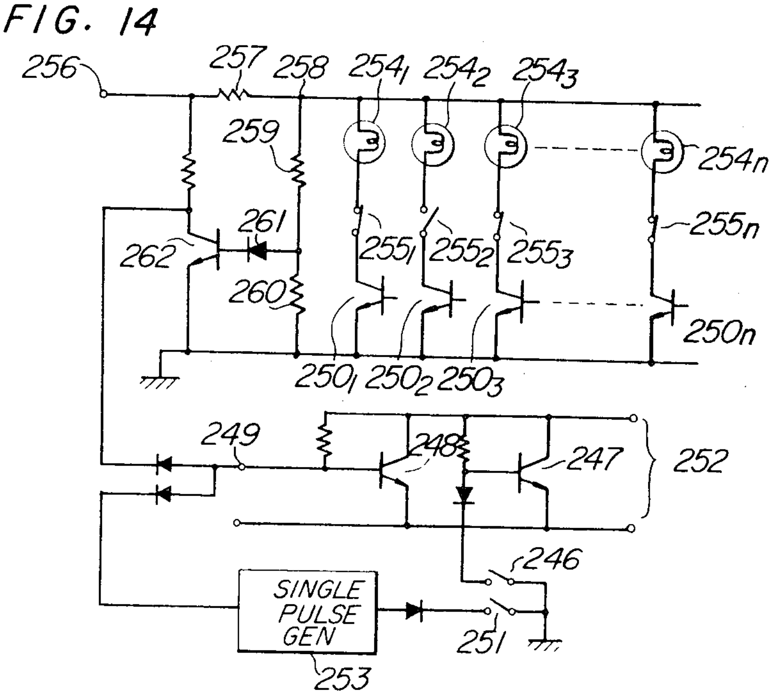
FIG. 14 is a circuit diagram of an example of the circuit for the channel skip selection.

The circuit shown in FIG. 14 enables selecting only the authorized channels by skipping the non-authorized channels. In the FIG. 1 switch 246, transistors 247 and 248 and a terminal 252 respectively correspond to the switch 150 or 151, the transistors 149 and 191 and the terminal 192, shown in FIG. 6, and transistors $250_1$ to $250_n$ correspond to the transistors $240_1$ to $240_{16}$ shown in FIG. 10. When the transistor 248 is off, and the switch 246 is closed, the clock pulse generator 148 of FIG. 6 starts to generate clock pulses, as shown at (*a*) in FIG. 15. In other words, the above clock pulse generator becomes operative when the input side of the AND circuit consisting of the transistors 247 and 248 is grounded (made to be at the low level) and a cut-off state is brought about between terminals 252.

Figure 15A:
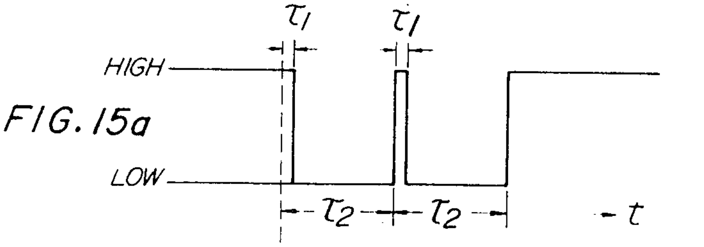
FIG. 15 (*a-c*) shows waveforms to illustrate the operation of the circuit for the channel skip selection.
Figure 15B:
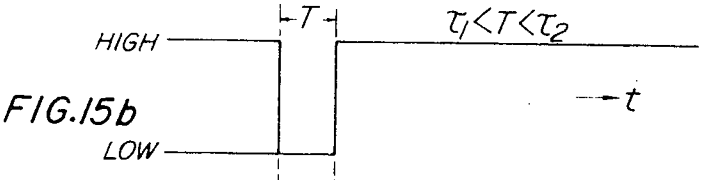
Figure 15C:
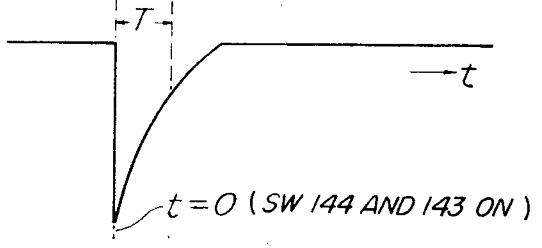

If the switch 251 is closed simultaneously with the switch 246, a single pulse generator 253 such as s monostable multi-vibrator is driven to produce output as shown at (*b*) in FIG. 15. The pulse width T of the output (*b*) in FIG. 15 is made to be $$\tau_1 < T < \tau_2,$$

where $\tau_1$ and $\tau_2$ are respectively the pulse width and pulse period of the output (*a*) of the clock pulse generator. If $\tau_1$ is extremely small as compared to the period, for which the switch is being closed through the ordinary manual operation, the clock pulse generator starts operation by the action of the AND circuit consisting of the transistors 247 and 248.

It is now assumed that the transistor $250_1$ is on and a channel indicator lamp $254_1$ is on to indicate that a corresponding channel is being received. Switches $255_1$ to $255_n$ or equivalents thereto may be preset to be closed or open; those corresponding to authorized channels are closed, and those corresponding to non-authorized channels are open. The switch $255_1$ corresponds to an authorized channel, because it is closed.

As is previously mentioned, by simultaneously closing the switches 246 and 251 the clock pulse generator becomes operative, whereupon the reversible counter circuit of FIG. 6 acts accordingly to switch channels, thus turning off the lamp $254_1$. If the current through the lamp $254_1$ has been from a high-voltage source connected to a terminal 256 and through a resistor 257, a connection point 258 is held at the same potential as the terminal 256 during a period from the extinguishing of the lamp $254_1$ till the lighting of another lamp. During this period, the voltage on the point 258 is divided between resistors 259 and 260, so that a switching transistor 262 carries current through a level shift diode 261 to render the output to be at the low level near the ground level. A switch $255_2$ is open, so an associated lamp $254_2$ is off. The output remains at the low level until a next lamp $254_3$, whose associated switch $255_3$ is closed, turns on, whereupon the voltage on the point 258 is decreased to invert the base voltage on the transistor 262 into the low level through the action of the level-shift diode 261, thus cutting off the transistor 262 and shifting the output into the high level. At this time, the output of the single pulse generator 253 is already at the high level. Thus, when the switch 251 is closed synchronously with the switch 246 to turn off a lamp, an OR circuit terminal 249 is rendered into the low level, so that the transistor 248 remains off until another lamp corresponding to an authorized channel turns on.

By pre-determining $\tau_2$ such that the switches 246 and 251 are closed by pushing a manual button for a time interval at least several times $\tau_2$, the switching may be realized as though the nearest authorized channel is tuned in at the instance the button is pushed in spite of a slight time lag involved in skipping an adjacent channel or channels, over which no broadcast signal is sent.

As the switches 246 and 251 may be used non-mechanical switches such as electronically operated switches, optical switches, magnetic switches, etc. Also, the indicator lamps, which are incandescent lamps in this embodiment, may be replaced with other indicating means such as figure indicator discharge tubes. Further, the single pulse generator may be replaced with a circuit having a certain CR factor for the charging and discharging of a capacitor as shown at (*c*) in FIG. 15.

Figure 16:
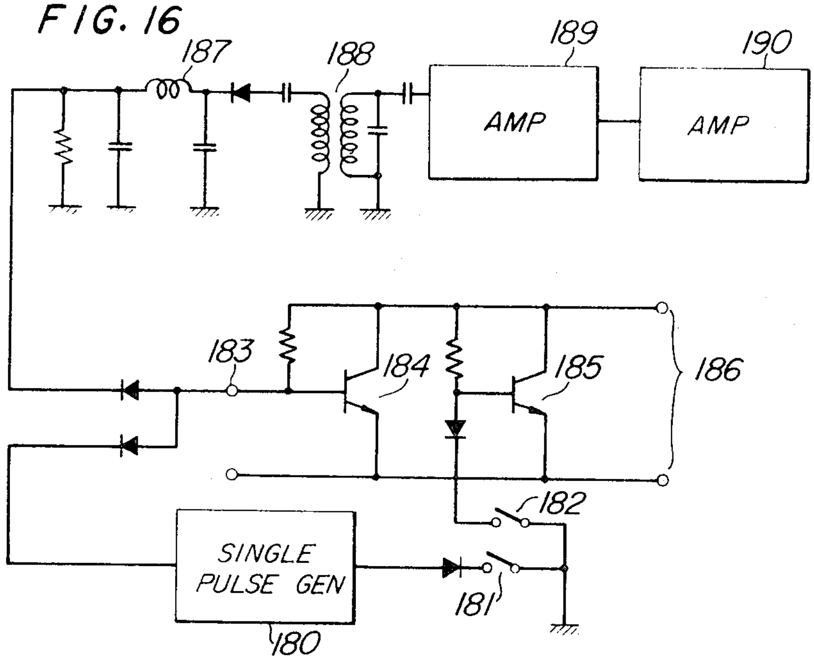
FIGS. 16 and 17 are circuit diagrams of other examples of the circuit for the channel skip selection.
Figure 17:
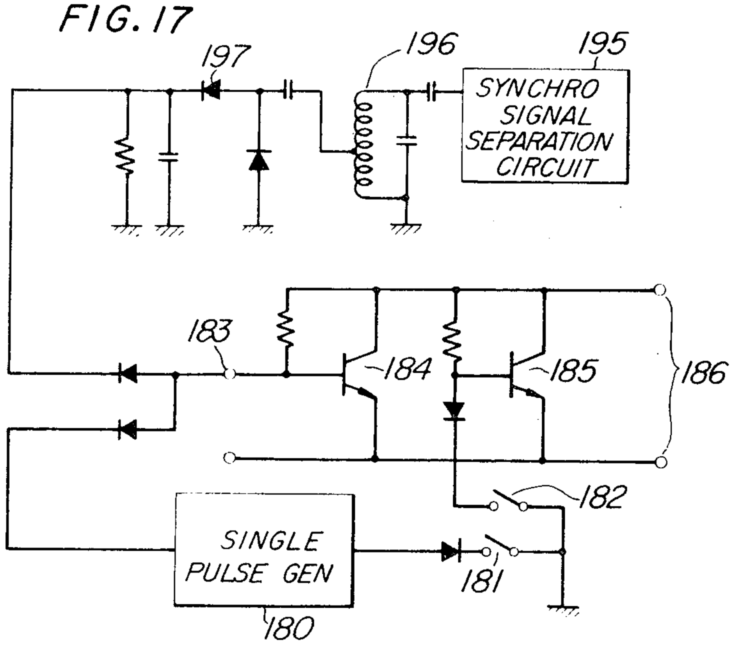

Other examples of the circuit for the channel skip selection are shown in FIG. 16 and 17. In the circuit construction shown in FIG. 16, a switch 182, transistors 185 and 184 and a terminal 183 respectively correspond to the switch 150 or 151, the transistors 149 and terminal 191, and 192 shown in FIG. 6.

In operation, when the transistor 184 is off, and the switch 182 is closed, clock pulse generator 148 of FIG. 6 generates clock pulses shown at (*a*) in FIG. 15. In other words, the clock pulse generator becomes operative when the input side of the AND circuit consisting of transistors 184 and 185 is grounded (made to be at the low level) to cut current through a load 186.

If the switch 181 is closed simultaneously with the switch 182, a single pulse generator 180, for instance a monostable multi-vibrator, is driven to produce an output as shown at (*b*) in FIG. 15. As has been previously mentioned, the pulse width of the output (*b*) is made to be $$\tau_1 < T < \tau_2;$$

where $\tau_1$ and $\tau_2$ are respectively the pulse width and pulse period of the output (*a*). If $\tau_1$ is extremely small as compared to the period, for which the switch 182 is closed through the ordinary manual operation, the clock pulse generator becomes operative upon the action of the AND circuit consisting of the transistors 184 and 185. In FIG. 16, numeral 190 designates an intermediate video frequency amplifier in a television set, numeral 189 designates another amplifier to amplify the intermediate video frequency of the output of the amplifier 190, numeral 188 designates a tuning circuit tuned to the intermediate video frequency of the output of the amplifier 188, and numeral 187 designates a rectifying circuit to rectify the intermediate video frequency signal. When a channel is being received, a voltage of a positive polarity is produced by the rectifier 187 is applied as the high-level input to the input terminal 183 connected to the base of the transistor 184 via a diode.

By simultaneously closing the switches 181 and 182 the clock pulse generator becomes operative, as has been previously mentioned, thereby switching channels by the action of the reversible counter circuit, so that the previous channel cannot continue to be tuned in. When the next channel is a non-authorized channel carrying no broadcast signal, for which no intermediate video frequency signal is available, the output of the rectifying circuit 187 is rendered into the ground level (the low level). As the reversible counter circuit continuously operates to select an authorized channel carrying the broadcast signal, soon the output of the rectifying circuit soon goes to the high level again upon impression of a corresponding intermediate video frequency signal input on the amplifier 189. At this time, the output of the signal pulse generator is already at the high level. Thus, when the switch 181 is closed simultaneously with the switch 182 to temporarily cease the reception, the output of the OR circuit for the transistor 184 is rendered into the low level, so that the transistor 184 remains off until another authorized channel is tuned.

By pre-setting $\tau_2$ such that the switch 181 is closed by pushing a manual button for a time interval at least several times $\tau_2$, the switching may be realized as though the nearest authorized channel is tuned at the instance the button is pushed in spite of a slight time lag involved in skipping an adjacent channel or channels, which are not authorized for the television broadcasting.

Similar to the case with FIG. 14, the switches 181 and 182 may as well be non-mechanical switches such as electronically operated switch, optical switch, magnetic switch, etc.

In the circuit construction shown in FIG. 17, which shows a different example of the circuit for the channel skip selection, parts 180 to 186 are the same as those in FIG. 16, so their operation is not described. This circuit comprises a synchronization signal separation circuit 195, a tuning circuit 196 tuned to a horizontal synchronization signal frequency, a rectifying circuit 197 to rectify the horizontally synchronized frequency signal output of the tuning circuit 196. When an authorized channel is being received, a synchronization signal appears at the tuning circuit 196, and the rectifying circuit 197 produces a positive voltage for impression as the high-level input upon the input terminal 183 for the transistor 184 via a diode.

By simultaneously closing the switches 181 and 182 the clock pulse generator becomes operative, as has been mentioned earlier, thereby switching channels by the action of the reversible counter circuit of FIG. 5 or 6, thus interrupting the reception of the previous channel. When the next channel carries no broadcast signal, the synchronization signal separation circuit 195 provides no synchronization signal, so that the output of the rectifying circuit 197 is rendered into the ground level (the low level). As the reversible counter circuit continuously operates to select an authorized channel carrying the broadcast signal, the output of the rectifying circuit 197 returns to the high level upon delivery of a synchronization signal from the circuit 195. At this time, the output of the single pulse generator 180 is already at the high level. Thus, when the switch 181 is closed simultaneously with the switch 182 to temporarily cease the reception of the broadcast, the OR circuit terminal on the input side of the transistor 184 is rendered into the low level, so that the transistor 184 remains off until another authorized channel is turned.

As is described, the above circuit construction enables the selection of only the authorized channels by skipping the non-authorized channels by appropriately presetting the connection of the associated switches to stop the generation of clock pulses when an authorized channel is located so as to stop the tuning operation, thus automatically enabling reception of the authorized channel, which is extremely advantageous in practice.

Figure 18:
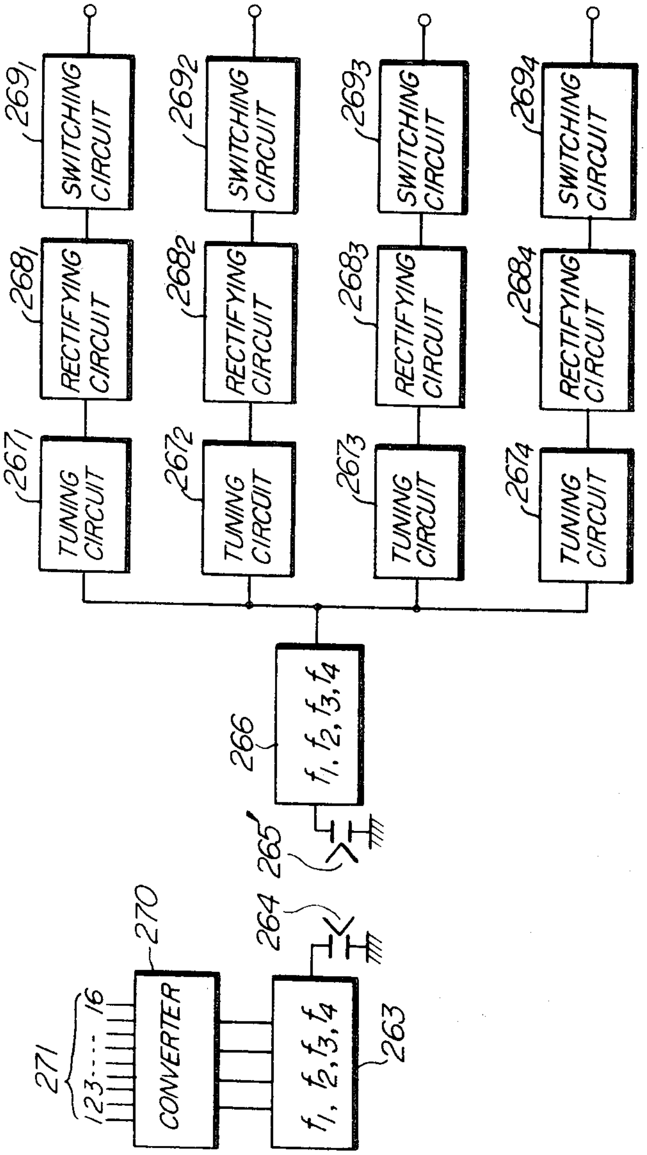
FIG. 18 is a schematic circuit diagram of a remote control.

By a remote control means as shown in FIG. 18, a desired channel may be selected under the remote control, for instance, by pushing a button. Without the apparatus as shown in FIG. 8, the selection of a channel among 16 channels requires 16 different frequencies resulting in larger sizes of the oscillators, receiving set and the channel selection circuit, which is not practical. Also, a superior frequency characteristic of a supersonic electric converter is required, which is also not practical. According to the invention, these problems are overcome, because the selection among the 16 channels requires only 4 different frequencies, which is attained by means of information in the form of binary signals to be described hereinafter. The circuit construction shown in FIG. 18 comprises a supersonic frequency generator 263 capable of oscillation at 4 different frequencies $f_1$, $f_2$, $f_3$ and $f_4$, a converter 265 to convert a supersonic signal into a corresponding electric signal, an amplifier 266 to amplify four signals at the respective frequencies $f_1$ to $f_4$, rectifying circuits $267_1$ to $267_4$ tuned to the respective frequencies $f_1$ to $f_4$, rectifying circuits $268_1$ to $268_4$ to rectify respective resonant AC signals from the associated tuning circuits $267_1$ to $267_4$, and switching circuits $269_1$ to $269_4$ driven by the respective outputs from the associated rectifying circuits $268_1$ to $268_4$.

If a converter 270 is intended to produce binary signals in correspondence to channels in accordance with Table 4, the oscillator 263 is controlled by a binary signal corresponding to one of the channels indicated at 271 to produce oscillations at a corresponding set of frequencies $f_1$ to $f_4$.

Figure 19:
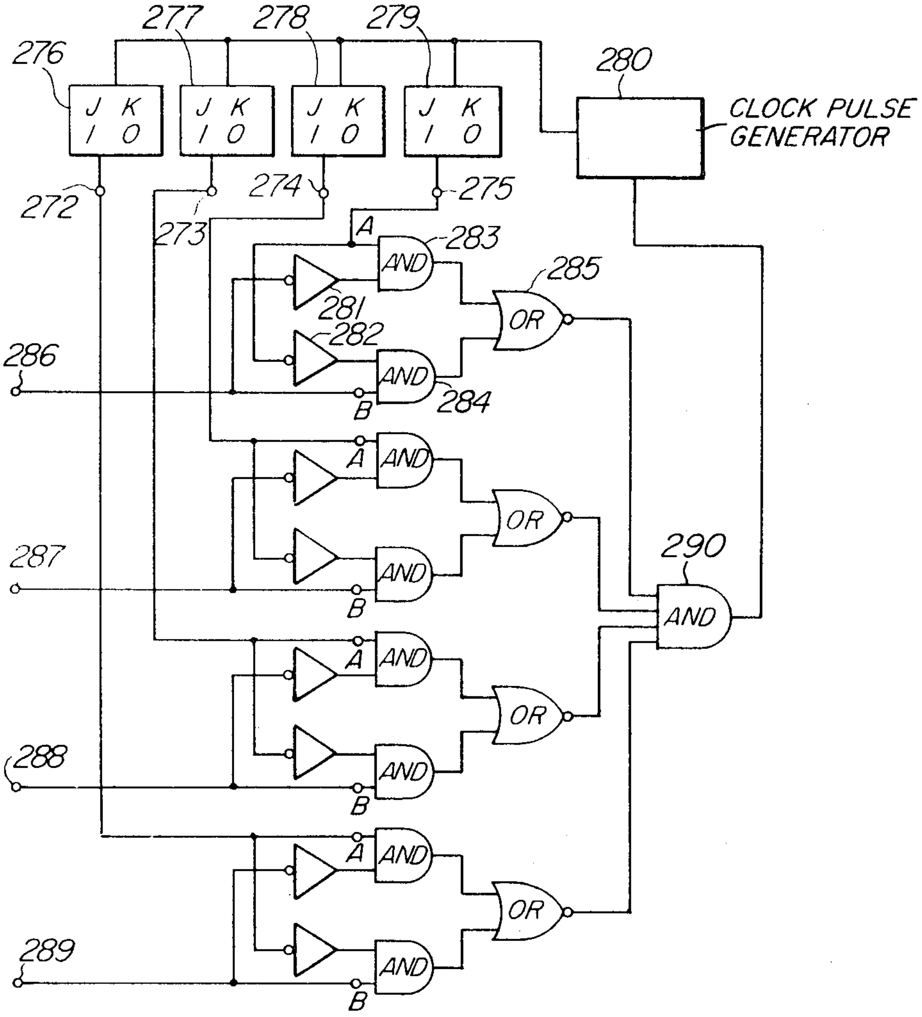
FIG. 19 is a schematic circuit diagram of a further example of the circuit for the channel skip selection.

Referring to FIG. 19, numerals 272 to 275 designate respective binary signal input terminals, and numerals 276 to 279 designate respective counter circuits each consisting of a J-K flip-flop. Numeral 280 designates a clock pulse generator of the same construction as the clock pulse generator of FIG. 6. The J-K flip-flop circuits 276 and 279 have respective output terminals 272 to 275 respectively connected to input circuits A of associated comparing circuits each comprising inverters 281 and 282, AND circuits 283 and 284 and an OR circuit 285. Each of these comparing circuits has another input circuit B in connection with an associated one of input terminals 286 to 289. Each comparing circuit produces an output as a result of a corresponding combination of inputs at the input circuits A and B, as shown in Table 5.

TABLE 5

| Input at A | Input at B | Output |
|---|---|---|
| 0 | 0 | 1 |
| 0 | 1 | 0 |
| 1 | 0 | 0 |
| 1 | 1 | 1 |

As is seen, the output is "1" if the inputs to the input circuits A and B coincides, that is, both the inputs to the input circuits A and B are either "1" or "0". If output information in the form of a binary signal produced by the J-K flip-flops 276 to 279 coincides with the binary information added to the input terminals 286 to 289, all the outputs of the comparing circuits are "1". When an AND circuit 290 receives these outputs, its output is "1". If some, but not all, of the above outputs are "0", the output of the AND circuit 290 is "0". The clock pulse generator circuit 280 includes only one capacitor to facilitate the fabrication of a corresponding integrated circuit, to which may be connected the capacitor, and its pulse period and pulse width are determined by the resistor and capacitor 178 and 179 shown in FIG. 6. It becomes operative when the transistor 149 is cut off, that is when the switches 150 or 151 is closed. If the switch 150 corresponds to the output of the AND circuit 290 of FIG. 19, the clock pulse generator circuit 280 ceases oscillation only when the binary signal appearing at the output terminals 276 to 279 of the J-K flip-flops 272 to 275 coincides with the binary signal added to the terminals 286 to 289, and in all other cases the oscillation is continued. In other words, a desired channel may be received by adding a corresponding binary signal to the terminals 286 to 289.

In case the skipping action is involved, either the authorized channels or the non-authorized channels may be memorized, so that the non-authorized channels may be skipped to select only the authorized channels when a binary signal corresponding to an authorized channel is added to the terminals 286 to 289.

Figure 20:
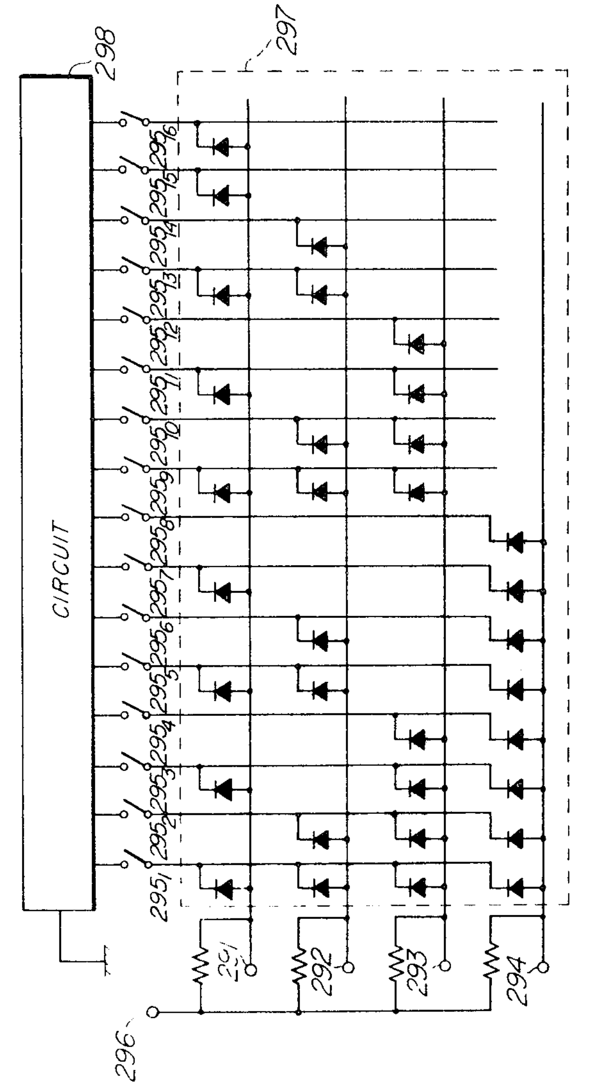
FIG. 20 is a circuit diagram of a still further example of the channel skip selection circuit.

FIG. 20 shows an example of the circuit connected to the terminals 286 to 289 in FIG. 19. The circuit comprises output terminals 291 to 294 connected to the respective input terminals 286 to 289, switches $295_1$ to $295_{16}$, a terminal 296 for application of the high-level voltage, a circuit enclosed within a dashed line loop 297, which consists of a diode matrix for the one-to-one correspondence between n channels and the corresponding number of binary signals, and circuit 298, which is scanned, for instance, by the output of the NAND gate set shown in FIG. 9 or FIG. 12. By arranging such that the switches corresponding to the authorized channels among the switches $295_1$ to $295_{15}$ are closed and the switch $295_{16}$ is open for reception of the corresponding channel, and by memorizing the authorized channel, only the binary signals corresponding to the authorized channels appear at the terminals 291 to 294 when the clock pulse generator 280 is operative. In this case the binary signal [1111] corresponds to a channel to be skipped. In case of the channel corresponding to the switch $295_{16}$, which is open in contract to the switches $295_1$ to $295_{15}$, the binary signal [1111] corresponds to an authorized channel and the binary signal [1110] corresponds to a channel to be skipped. The switch $295_{16}$ is made to be open in contrast to the rest of the switches, because if it were not made so, the scanning of the circuit 298, i.e. the oscillation of the clock pulse generator, would be stopped even for the channel to be skipped.

Figure 21B:
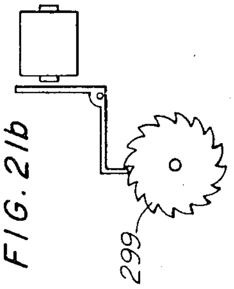
FIGS. 21*a* and 21*b* show the construction of the channel indicator.
Figure 21A:
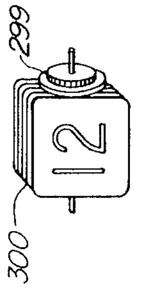

FIGS. 21_a_ and 21_b_ show different examples of the channel indicator construction. The figure indicator shown at FIG. 21_a_ may be rotated synchronously with the clock pulse generator 280 of FIG. 19 for the channel indication. The output of the clock pulse generator is suitably amplified for the actuation of a ratchet relay shown at FIG. 21_b_ to rotate a ratchet gear 299 so as to rotate an indicator boad 300. The ratchet gears 299 shown at FIGS. 21_a_ and 21_b_ are identical. Also, the indicator boad may be manually rotated to provide for the correction in case the channel indication will not identify the channel being received. This is particularly advantageous for the channel indication of UHF channels.

The channel selection circuit of the foregoing circuit construction may be very easily made into an integrated circuit. In recent times, the advancement of the technique in and reduction in the cost of manufacture of integrated circuits are remarkable, and various domestic apparatus can make use of the merits of integrated circuits. The invention revolutionalizes the conventional channel selection system for television sets, which uses many mechanical contacts, by utilizing the advantages of the integrated circuit. For the welfare apparatus, particularly the television set, the cost is an essential factor. In this respect, the cost of an integrated circuit, particularly the one having a high degree of integration, is widely reduced with respect to the cost of the conventional equivalent having mechanical contacts, which is also very advantageous.

Also, as the binary signal memory circuit takes part of selection and memorization of channels, channel indication, switching between the high and low ranges of the VHF band and switching between the sources for the VHF-band tuner and the UHF-band tuner, the connection of various parts may be simplified as compared to a construction of the *n*-digit circuit for the selection and memorization of channels. Particularly, if an indicator drive is to be provided separately for the rest of the system, connection pins may be minimized to a great extent. Further, the digital indication of channels may be readily made.

Furthermore, the channel selection may be realized as though the nearest authorized channel is tunable almost instantaneously in spite of a slight time lag involved in skipping an adjacent channel or channels, which proves of great practical advantage.

Moreover, the selection of intended channels and associated indicators, switching between the high and low ranges of the VHF-band and switching between the sources for the VHF-band tuner and the UHF-band tuner are carried out in such a manner that the function of the selection and memorization by the reversible binary counter circuit replaces that of the binary *n*-digit selection circuit, the connection of the relevant parts may be simplified as compared to the construction of the *n*-digit circuit for the selection and memorization of channels. Particularly, if an indicator drive is to be provided separately from the rest of the system, connection pins may be minimized to a great effect. Still the more, the channel selection in either direction may be conveniently be made by a simple circuit.

Further, if once a channel is selected, the selected channel is never de-tuned by variation of the intensity of the electric field of the broadcast waves and by external signals such as the audio carrier waves, because the part to memorize the selected channel is taken by the flip-flops within the binary counter circuit.

What we claim is:

1. A system for selecting channels comprising a channel selection circuit constituted by a digitally controlled analog voltage generator circuit including a plurality of gate circuits corresponding to respective channels, each of said gate circuits having a load tapped for connection through a diode to a point common to said gate circuits, a binary signal generator connected to the input side of said channel selection circuit, and a tuner circuit connected to the output side of said channel selection circuit and including variable capacitance diodes, said system being characterized in that a binary signal generated by said binary signal generator is fed to said channel selection circuit to select a corresponding one of said gate circuits so as to cause current to flow through the load of said selected gate circuit and cause no current to pass through the loads of the rest of said gate circuits, thereby producing a corresponding predetermined voltage on said point common to said gate circuits for impression on said variable capacitance diodes to tune in a corresponding channel.

2. The system for selecting channels according to Claim 1, characterized in that a reversible binary counter circuit is used as said binary signal generator.

3. The system for selecting channels according to claim 2, wherein output of said reversible binary counter circuit is fed to said channel selection circuit to select a channel circuit corresponding to said output so as to obtain a corresponding predetermined voltage in accordance with the presetting of said selected channel circuit for impression on said variable capacitance diodes, which are turning elements, and whose capacitance is controlled accordingly for the reception of a corresponding tuned channel, while at the same time an OR circuit and a switch circuit are provided on the output side of said channel selection circuit to effect switching between the reception bands of the VHF-band and switching between the VHF-band and the UHF-band.

4 The system for selecting channels according to claim 2, wherein said reversible binary counter circuit produces four-bit binary signals for impression on said channel selection circuit, which in turn produces one of 16 different output signals, eight of said output signals corresponding to respective eight VHF-band channels and the other 8 of said output signals corresponding to respective 8 UHF-band channels, to select a channel circuit corresponding to said produced output signal so as to obtain a corresponding predetermined voltage memorized by said selected channel circuit for impression on said variable capacitance diodes to tune in a corresponding channel, while at the same time output produced in the highest place circuit of said channel selection circuit is responsible for switching between the band regions of the VHF-band, switching between the VHF-band and the UHF-band and actuation of a corresponding channel indicator.

5. The system for selecting channels according to claim 3, wherein output of said reversible binary counter circuit is fed to said channel selection circuit to select a channel circuit corresponding to said output so as to obtain a corresponding predetermined voltage in accordance with the presetting of said selected channel circuit for impression on said variable capacitance diodes, which are tuning elements, and whose capacitance is controlled accordingly to receive a corresponding tuned channel, an OR circuit and a switch circuit provided on the output side of said channel selection circuit and corresponding to said output of said reversible binary counter circuit perform switching between the band regions of the VHF band and switching between the VHF band and the UHF band, and a channel indicator corresponding to said tuned channel is turned on by the action of an electronic switching circuit, whose output and output of a single pulse generator circuit are added to an OR circuit, whose output is in turn added to one input terminal of an AND circuit, which has the other input terminal connected to a switch ganged with a switch to operate said single pulse generator so as to synchronously operate said AND circuit, and which produces output to operate a clock pulse generator.

6. The system for selecting channels according to Claim 3, wherein output of said reversible binary counter circuit is fed to said channel selection circuit to select a channel corresponding to said output so as to obtain a corresponding predetermined voltage in accordance with the presetting of said selected channel circuit for impression on said variable capacitance diodes, which are tuning elements, and whose capacitance is controlled accordingly to receive a corresponding tuned channel, while at the same time an OR circuit and a switch circuit provided on the output side of said reversible binary counter circuit perform switching between the band regions of the VHF band and switching between the VHF band and the UHF band, and an output of a synchronization signal separation circuit and output of a single pulse generator circuit are added to an OR circuit, whose output is in turn added to one input terminal of an AND circuit, which has the other input terminal connected to a switch to operate said AND circuit synchronously with the action of a switch to operate said single pulse generator, and which produces output to operate a clock pulse generator.

7. The system for selecting channels according to claim 3, wherein the output of said reversible binary counter circuit is fed to said channel selection circuit to select a channel circuit corresponding to said output so as to obtain a corresponding predetermined voltage in accordance with the presetting of said selected channel circuit for impression on said variable capacitance diodes, which are tuning elements, and whose capacitance is controlled accordingly to receive a corresponding tuned channel, while at the same time an OR circuit and a switch circuit are provided on the output side of said channel selection circuit and corresponding to said output of said reversible binary counter circuit to effect switching between the band regions of the VHF band and switching between the VHF band and the UHF band, said system further including an intermediate video frequency amplifier, a rectifier to rectify an intermediate video frequency signal generated in correspondence to said tuned channel by said intermediate video frequency amplifier into a corresponding DC voltage, a single pulse generator, an OR circuit receiving the outputs of said rectifier and of said single pulse generator, and AND circuit having one input terminal to receive the output of said OR circuit and the other input terminal connected to a switch to operate said AND circuit synchronously with the action of a switch to operate said single pulse generator, and a clock pulse generator operated by the output of said AND circuit.

8. The system for selecting channels according to claim 1, wherein output of said reversible binary counter circuit is fed to said channel selection circuit to select a channel corresponding to said output so as to obtain a corresponding predetermined voltage in accordance with the presetting of said selected channel circuit for impression on said variable capacitance diodes, which are tuning elements, and whose capacitance is controlled accordingly to receive a corresponding tuned channel, while at the same time an OR circuit and a switch circuit are provided on the output side of said reversible binary counter circuit to effect switching between the band regions of the VHF band an switching between the VFH band and the UHF band, said reversible binary counter circuit being a memory circuit.

9. The system for selecting channels according to claim 1, wherein a clock pulse generator driving said binary signal generator becomes inoperative if information in the form of a binary signal corresponding to a channel coincides with output of said binary signal generator, which is a binary counter circuit, to select a channel circuit corresponding to the output of said binary counter circuit so as to obtain a corresponding predetermined voltage in accordance with the presetting of said selected channel for impression on said variable capacitance diodes, which are tuning elements, and whose capacitance is controlled accordingly to receive a corresponding tuned channel.

10. The system for selecting channels according to claim 2, wherein said reversible binary counter includes a pulse generator circuit comprising a charging-and-discharging circuit having a resistor and a capacitor, and a Schmitt trigger circuit.

11. The system for selecting channels according to claim 8, wherein said reversible binary signal generator is remotely controlled by a plurality of different supersonic signals at different frequencies.

* * * * *

PO-1050
(5/69)

UNITED STATES PATENT OFFICE
CERTIFICATE OF CORRECTION

Patent No. 3,654,557 Dated April 4, 1972

Inventor(s) Yoichi SAKAMOTO et al

It is certified that error appears in the above-identified patent and that said Letters Patent are hereby corrected as shown below:

In the Claim for Convention Priority, ten of the eleven Japanese applications claimed are missing and should be included as follows:

-- Japan, Patent Application No. 30693/69 filed on April 14, 1969
Japan, Patent Application No. 30694/69 filed on April 14, 1969
Japan, Patent Application No. 30881/69 filed on April 16, 1969
Japan, Patent Application No. 30882/69 filed on April 16, 1969
Japan, Patent Application No. 41255/69 filed on May 23, 1969
Japan, Patent Application No. 43040/69 filed on May 28, 1969
Japan, Patent Application No. 43041/69 filed on May 28, 1969
Japan, Patent Application No. 49814/69 filed on June 23, 1969
Japan, Patent Application No. 63624/69 filed on August 8, 1969
and Japan, Patent Application No. 63625/69 filed on August 8, 1969.

Signed and sealed this 20th day of March 1973.

(SEAL)
Attest:

EDWARD M.FLETCHER,JR.
Attesting Officer

ROBERT GOTTSCHALK
Commissioner of Patents